(12) United States Patent
Rhee et al.

(10) Patent No.: US 11,079,934 B2
(45) Date of Patent: *Aug. 3, 2021

(54) ELECTRONIC DEVICE AND METHOD FOR PROCESSING LETTER INPUT IN ELECTRONIC DEVICE

(71) Applicant: Samsung Electronics Co., Ltd., Suwon-si (KR)

(72) Inventors: Taik-Heon Rhee, Seoul (KR); Kwang-Min Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,965

(22) Filed: Jan. 13, 2020

(65) Prior Publication Data

US 2020/0150862 A1    May 14, 2020

Related U.S. Application Data

(63) Continuation of application No. 14/806,000, filed on Jul. 22, 2015, now Pat. No. 10,534,532.

(30) Foreign Application Priority Data

Aug. 8, 2014  (KR) .................. 10-2014-0102564
Oct. 1, 2014  (KR) .................. 10-2014-0132721

(51) Int. Cl.
*G06F 3/0488*  (2013.01)
*G06F 3/023*   (2006.01)
*G06F 3/0484*  (2013.01)

(52) U.S. Cl.
CPC ........ *G06F 3/04886* (2013.01); *G06F 3/0233* (2013.01); *G06F 3/0237* (2013.01); *G06F 3/04842* (2013.01)

(58) Field of Classification Search
CPC ............. G06F 3/04886; G06F 3/04842; G06F 3/0233; G06F 3/0237
See application file for complete search history.

(56) References Cited

U.S. PATENT DOCUMENTS 5,761,689 A     6/1998  Rayson et al.
7,453,439 B1 *  11/2008 Kushler ............... G06F 3/0237
                                                  345/168
(Continued)

FOREIGN PATENT DOCUMENTS

EP          2 293 177 A2      3/2011
KR      10-2014-0048830 A     4/2014
WO        2005/064587 A2      7/2005

OTHER PUBLICATIONS

Examination report dated Oct. 2, 2018, issued in the European application No. 15180167.7.
(Continued)

*Primary Examiner* — Tadesse Hailu
(74) *Attorney, Agent, or Firm* — Jefferson IP Law, LLP

(57) ABSTRACT

A method for processing a letter input in an electronic device is provided. The method includes, if at least one letter is input, determining at least one input behavior related to the input and if a predetermined delimiter is input, determining whether to disable a function of automatically recommending at least one word similar to an input word, based on the determined input behavior.

15 Claims, 21 Drawing Sheets

(56) References Cited

U.S. PATENT DOCUMENTS

| | | |
|---|---|---|
| 8,612,213 B1 | 12/2013 | Zhai et al. |
| 8,713,433 B1 | 4/2014 | Ouyang et al. |
| 2004/0021691 A1* | 2/2004 | Dostie .................. G06F 3/04886 715/773 |
| 2005/0210402 A1 | 9/2005 | Gunn |
| 2007/0079239 A1* | 4/2007 | Ghassabian .......... G06F 3/04886 715/707 |
| 2008/0316212 A1 | 12/2008 | Kushler |
| 2009/0007001 A1 | 1/2009 | Morin et al. |
| 2009/0104943 A1 | 4/2009 | Park et al. |
| 2009/0249232 A1 | 10/2009 | Lundy et al. |
| 2010/0070908 A1 | 3/2010 | Mori et al. |
| 2010/0131900 A1 | 5/2010 | Spetalnick |
| 2010/0134413 A1 | 6/2010 | Willey |
| 2011/0007004 A1* | 1/2011 | Huang .................. G06F 3/0237 345/173 |
| 2011/0050628 A1 | 3/2011 | Homma et al. |
| 2011/0095986 A1 | 4/2011 | Aono et al. |
| 2011/0154193 A1 | 6/2011 | Creutz et al. |
| 2011/0202836 A1 | 8/2011 | Badger et al. |
| 2011/0202876 A1 | 8/2011 | Badger et al. |
| 2012/0036469 A1 | 2/2012 | Suraqui |
| 2013/0021248 A1 | 1/2013 | Eleftheriou |
| 2013/0027313 A1 | 1/2013 | Miyamoto |
| 2013/0033444 A1 | 2/2013 | Park et al. |
| 2013/0046544 A1 | 2/2013 | Kay et al. |
| 2013/0125034 A1 | 5/2013 | Griffin et al. |
| 2013/0125037 A1 | 5/2013 | Pasquero et al. |
| 2013/0212515 A1 | 8/2013 | Eleftheriou |
| 2013/0226960 A1 | 8/2013 | Simpson et al. |
| 2013/0285913 A1 | 10/2013 | Griffin et al. |
| 2013/0285916 A1 | 10/2013 | Griffin et al. |
| 2013/0325438 A1 | 12/2013 | Griffin et al. |
| 2014/0123050 A1* | 5/2014 | Danielsson ........... G06F 3/0488 715/773 |
| 2014/0164973 A1 | 6/2014 | Greenzeiger et al. |
| 2014/0208258 A1 | 7/2014 | Yuen et al. |
| 2014/0306927 A1 | 10/2014 | Kashiwagi et al. |
| 2015/0012873 A1 | 1/2015 | Bi et al. |
| 2015/0039582 A1 | 2/2015 | Liutikas et al. |
| 2015/0121285 A1 | 4/2015 | Eleftheriou et al. |
| 2015/0317069 A1* | 11/2015 | Clements .............. G06F 3/0237 715/773 |
| 2015/0347007 A1* | 12/2015 | Chaudhri .............. G06F 40/274 715/773 |
| 2015/0370345 A1* | 12/2015 | VanBlon ............... G06F 40/274 715/271 |
| 2016/0004325 A1* | 1/2016 | Roe ....................... G06F 3/0237 345/168 |
| 2016/0070465 A1 | 3/2016 | Stewart et al. |
| 2016/0328147 A1 | 11/2016 | Zhang et al. |

OTHER PUBLICATIONS

Extended European Search Report dated Apr. 30, 2021, issued in European Patent Application No. 21157343.1.

\* cited by examiner

ELECTRONIC DEVICE AND METHOD FOR PROCESSING LETTER INPUT IN ELECTRONIC DEVICE

CROSS-REFERENCE TO RELATED APPLICATION(S)

This application is a continuation application of prior application Ser. No. 14/806,000, filed on Jul. 22, 2015, which has issued as U.S. Pat. No. 10,534,532 on Jan. 14, 2020 and was based on and claimed priority under 35 U.S.C. § 119(a) of a Korean patent application filed on Aug. 8, 2014 in the Korean Intellectual Property Office and assigned Serial number 10-2014-0102564, and of a Korean patent application filed on Oct. 1, 2014 in the Korean Intellectual Property Office and assigned Serial number 10-2014-0132721, the entire disclosure of each of which is hereby incorporated by reference.

TECHNICAL FIELD

The present disclosure relates to an electronic device and a method for processing a letter input in an electronic device.

BACKGROUND

A variety of electronic devices have been developed to support various functions. These electronic devices may be equipped with a display to allow the user to more efficiently enjoy various functions. For example, a smart phone may be equipped with a display (e.g., a touch screen), the front of which is sensitive to a touch.

In addition, a variety of applications ('Apps') may be installed and executed in an electronic device. In order to execute and control the applications on the electronic device, various input means (e.g., a touch screen, a button, a mouse, a keyboard, a sensor, etc.) may be used.

One of the most frequently used functions in the electronic device is a letter input (or text input) function. Using the letter input function, the user may enjoy a messaging service, a social networking service, a chat service, a search service, or the like. For example, the electronic device may add, to the letter input function, an automatic recommendation function of modifying typos or recommending a standard word most similar to the input letters (or typed letters). For example, the user may enable or disable the automatic recommendation function in the setting menu of the electronic device.

As electronic devices are increasingly miniaturized, the size of keys for a letter input has also been reduced. When the user inputs or types text with small keys, it may be difficult to accurately input the text because the keys are small and the gap between the keys is narrow.

A small electronic device may require a letter input method for allowing the user to accurately input letters with fewer errors, using small keys.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for processing a letter input in an electronic device, in which the electronic device and the method may determine whether to automatically replace input letters with a recommended word and display the recommended word, based on a user's input behavior.

Another aspect of the present disclosure is to provide an electronic device and a method for processing a letter input in an electronic device. The method includes setting an automatic recommendation function depending on a user's input behavior, without separately performing an operation in which the user enables or disables the automatic recommendation function in a setting menu of the electronic device.

In accordance with an aspect of the present disclosure, a method for processing a letter input in an electronic device is provided. The method includes, if at least one letter is input, determining at least one input behavior related to the input and if a predetermined delimiter is input, determining whether to disable a function of automatically recommending at least one word similar to an input word, based on the determined input behavior.

In accordance with another aspect of the present disclosure, an electronic device is provided. The electronic device includes an input unit and a controller configured to, if at least one letter is input through the input unit, determine at least one input behavior related to the input, and determine, if a predetermined delimiter is input, whether to disable a function of automatically recommending at least one word similar to an input word, based on the determined input behavior.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
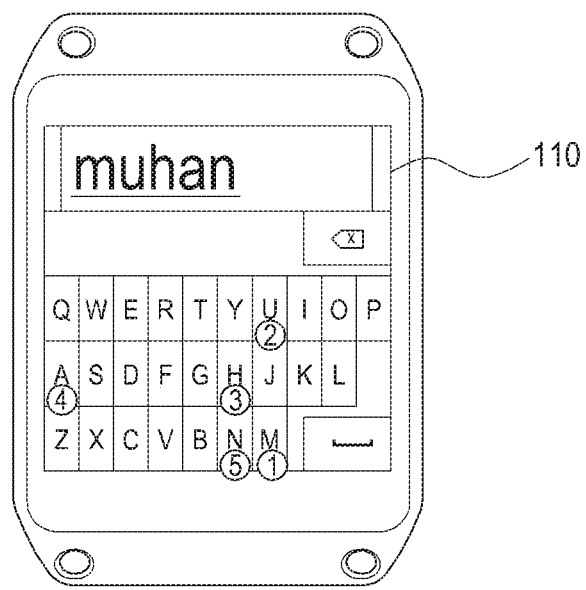
FIGS. 1A and 1B illustrate an example of an operation of processing a word input on a screen in an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene there between. In contrast, when a component is "directly connected to" or "directly coupled to" another component, no other intervening components may intervene there between.

The terms as used herein are provided merely to describe some embodiments thereof, but not to limit the present disclosure.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may be a device with a letter input function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device (e.g., a head mounted device (HMD) such as electronic glasses, electronic clothing, an electronic bracelet, an electronic necklace, an E-App accessory (or appcessory), electronic tattoo, or a smart watch).

According to various embodiments of the present disclosure, the electronic device may be a smart home appliance equipped with a letter input function. The smart home appliance, for example, the electronic device, may include at least one of television (TV), a digital video disc (DVD) player, an audio player, a refrigerator, an air conditioner, a cleaner, an oven, a microwave oven, a washer, an air purifier, a set-top box, a TV box (e.g., Samsung HomeSync™, Apple TV™ or Google TV™), a game console, an electronic dictionary, an electronic key, a camcorder or an electronic photo frame.

According to various embodiments of the present disclosure, the electronic device may include at least one of various medical devices (e.g., magnetic resonance angiography (MRA), magnetic resonance imaging (MRI), computed tomography (CT), medical camcorder, medical ultrasonic device, etc.), a navigation device, a global positioning system (GPS) receiver, an event data recorder (EDR), a flight data recorder (FDR), an automotive infotainment device, a marine electronic device (e.g., marine navigation device, gyro compass, etc.), avionics, a security device, a car head unit, an industrial or household robot, an automatic teller's machine (ATM) for banks, or point of sales (POS) for shops, each of which includes a letter input function.

According to various embodiments of the present disclosure, the electronic device may include at least one of a part of the furniture or building/structure, an electronic board, an electronic signature receiving device, a projector, or various meters (e.g., meters for water, electricity, gas or radio waves), each of which includes a letter input function. The electronic device according to various embodiments of the present disclosure may be one or a combination of the above-described various devices. The electronic device according to various embodiments of the present disclosure may also be a flexible device. It is apparent to those skilled in the art that the electronic device according to various embodiments of the present disclosure is not limited to the above-described devices.

The electronic device according to various embodiments of the present disclosure will now be described with reference to the accompanying drawings. As used herein, the term 'user' may refer to a person who uses the electronic device, or a device (e.g., an intelligent electronic device) that uses the electronic device.

According to various embodiments of the present disclosure, an electronic device may perform an automatic word recommendation function of determining whether an input word is a word defined in a dictionary and automatically changing or modifying the word depending on the determination.

As used herein, the letter, which is a unit for representing the language, may include a syllable (consonant or vowel) or an alphabet.

The automatic word recommendation function according to various embodiments of the present disclosure may be activated when a character (e.g., a delimiter such as 'space', 'enter' and 'tab', a number/symbol, or a letter (e.g., a syllable (consonant or vowel) in Korean) constituting another language), which does not belong to a set of letters supported by the currently set language, is input after at least one letter is input. In addition, the automatic word recommendation function may be activated even when arbitrary letters except for predetermined letters are input.

The user's input behavior according to various embodiments of the present disclosure may be a user's certain behavior that can be identified in the action that the user makes a touch on a touch keypad and then releases the touch, to input one letter code (or character). For example, the user's input behavior may include short press/long press (contact time), weak press/strong press (contact pressure), small area/large area (contact area), and tap/tap & drag (movement during contact). In addition, the user's input behavior may be any behavior including at least one user gesture.

For example, the types of the gestures may include a touch, which is a gesture where the user puts his/her finger on the display; a tap, which is a gesture where the user taps the display with one finger short and lightly; a double tap, which is a gesture where the user taps the display twice quickly; a flick, which is a gesture where the user removes the finger from the display before stopping the finger movement, in order to scroll or rotate the display quickly; a drag, which is a gesture where the user moves or scrolls a display element; a drag and drop, which is a gesture where the user moves an object while touching the object and then removes the finger after stopping the movement; a swipe, which is a gesture where the user moves a finger in the horizontal or vertical direction by a predetermined distance while putting the finger on the display; a multi-swipe, which is a gesture where the user moves two or three fingers in the horizontal or vertical direction by a predetermined distance while putting the fingers on the display; a pinch, which is a gesture where the user puts two fingers on the display and then moves the fingers in different directions; a touch and hold, which is a gesture where the user places a finger on the display until a display element appears; a shake, which is a gesture where the user shakes the electronic device to operate the electronic device according to the shaking action; and a rotate, which is a gesture where the user switches the direction of the display from the horizontal direction to the vertical direction, or from the vertical direction to the horizontal direction.

The automatic word recommendation function according to various embodiments of the present disclosure may include an operation of comparing input consonants, vowels or other letters with a predefined word dictionary or language model. For example, the automatic word recommendation function may estimate the frequency of use of a word depending on the result of the comparison, compare arbitrary words in terms of the similarity there between, determine a word most similar to the input word, and automatically recommend the determined word.

A syllable according to various embodiments of the present disclosure is a unit constituting one sound, and may be a unit in which a letter input according to various embodiments of the present disclosure is processed. According to various input languages, the unit in which a letter input is processed may be any unit of letters, such as a letter, a syllable and a word.

Figure 1B:
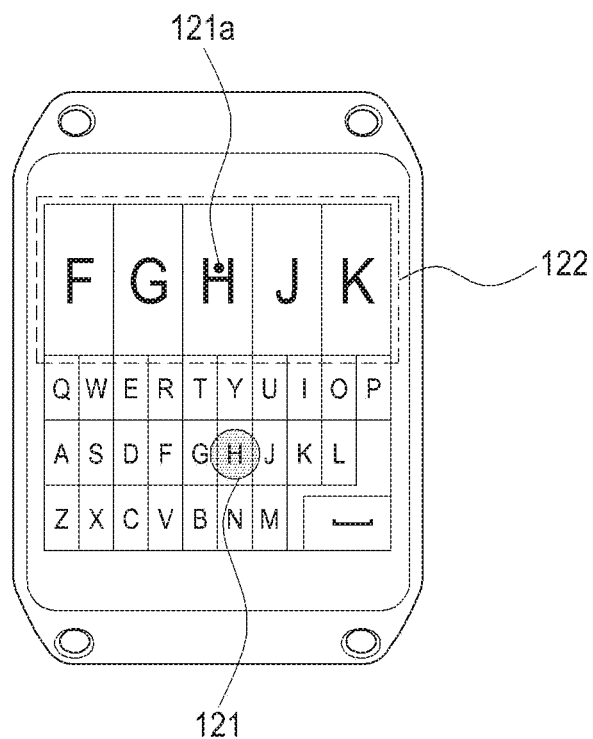

FIGS. 1A and 1B illustrate an example of an operation of processing a word input on a screen in an electronic device according to various embodiments of the present disclosure.

Referring to FIG. 1A, a screen 110 provided for a word input in an electronic device may include a keypad area in which the user may input letters, and a letter display area in which input letters are displayed. The keypad area may include letter keys by which the user may input letters, and special keys such as a space key or a backspace key.

For example, the user may input or type the letter keys in order of, for example, 'm', 'u', 'h', 'a', 'n'. Accordingly, 'muhan' may be displayed on the screen 110 according to the input order.

The electronic device according to various embodiments of the present disclosure may perform an automatic word recommendation function for the input 'muhan', when a predetermined delimiter (e.g., a space) is input after the electronic device detects an input of at least one letter key. For example, the automatic word recommendation function may include a function of, if an input word is not a word that is registered in advance in a dictionary, recommending a word most similar to the word, changing or modifying the input word to a recommended word, and displaying the recommended word.

According to various embodiments of the present disclosure, the automatic word recommendation function may be disabled depending on the speed at which the word is input. For example, if a predetermined delimiter (e.g., a space) is input after a word is input faster than a predetermined speed, the electronic device may run or enable the automatic word recommendation function.

According to various embodiments of the present disclosure, the 'muhan' may be changed or modified to a word 'human' that is most similar to the 'muhan' in a predefined dictionary, and then displayed on the screen 110. For example, if a predetermined delimiter (e.g., a space) is input after a word is input slower than a predetermined speed, the electronic device may disable the automatic word recommendation function. According to various embodiments of the present disclosure, the 'muhan' may be displayed as the input 'muhan' intact even though the 'muhan' is not a word that is included in a predefined dictionary.

Referring to FIG. 1B, according to various embodiments of the present disclosure, upon detecting a long touch of a specific key, the electronic device may provide a zoom user interface (UI) function of zooming in the perimeter of the specific key. For example, if the user makes a long-touch input on a key 121 to input 'H', the electronic device may display a screen 122 on which the perimeter of the key 121 is zoomed in, and the point 121a to which the user's input is applied presently may be displayed on the zoomed-in screen 122.

According to various embodiments of the present disclosure, if none of the keys (e.g., 'F', 'G', 'H', 'J' and 'K') displayed on the zoomed-in screen 122 correspond to the letter that the user desires to input, the user may make a long-touch input again on a key corresponding to the letter that the user desires to input, in the keypad area. In this case, the electronic device may switch the zoomed-in screen 122 to a screen that zooms in the perimeter of the key on which the user made a long-touch input again.

According to various embodiments of the present disclosure, while a gesture (e.g., drag) is input through the zoom-in screen 122, if the gesture input is released on a specific key (e.g., 'F', 'G', 'H', 'J' or 'K'), the electronic device display a letter corresponding to the key on which the gesture input is released, and stop displaying the zoom-in screen 122.

According to various embodiments of the present disclosure, as the electronic device provides the zoom UI, the user may exactly determine the position of the letter even on the small screen.

Although the zoomed-in screen according to various embodiments of the present disclosure is provided as an example of the zoom UI, other various visual effects such as a speech bubble may be possible.

Figure 2A:
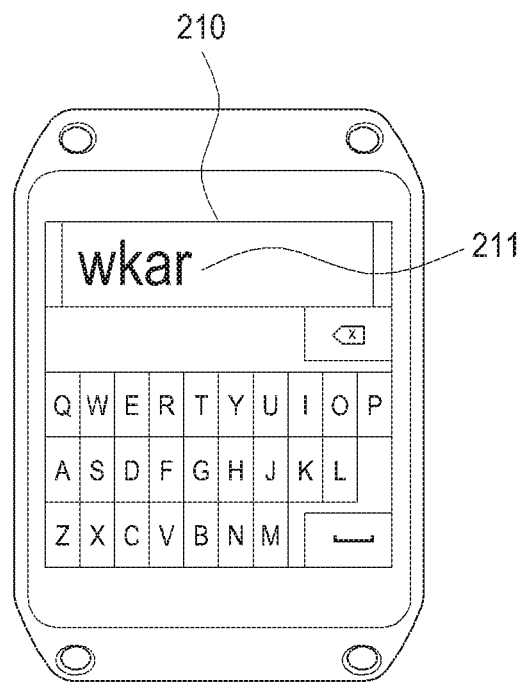
FIGS. 2A and 2B illustrate an example of an operation of recommending a word on a screen in an electronic device according to various embodiments of the present disclosure.
Figure 2B:
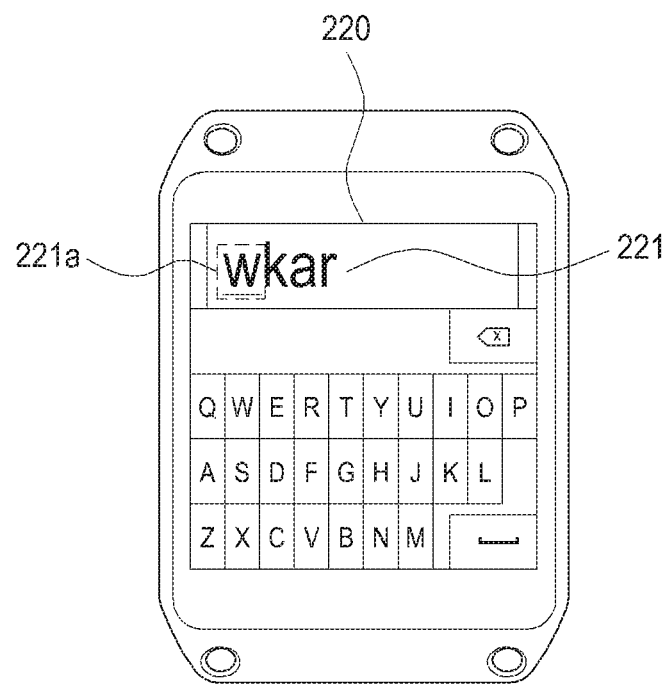

FIGS. 2A and 2B illustrate an example of an operation of recommending a word on a screen in an electronic device according to various embodiments of the present disclosure.

Referring to a screen 210 in FIG. 2A, the electronic device may run the automatic word recommendation function, as a predetermined delimiter (e.g., a space) is input after wkar 211 is input by the user. For example, as the wkar 211 is not a word that is defined in advance in a dictionary, the automatic word recommendation function may be performed on the wkar 211. Accordingly, words similar to the wkar 211 may be recommended in order of, for example, 'else', 'wise', 'what', 'rise', and 'wide'.

Referring to a screen 220 in FIG. 2B, though wkar 221 is input, the electronic device may determine the user's input behavior from at least one of the letters (consonants or vowels) constituting the wkar 221. For example, the user's input behavior may be an operation in which the user makes a long-touch input on the at least one letter for a predetermined time or more.

According to various embodiments of the present disclosure, 'w' 221a in the wkar 221 is a letter that the user's input behavior satisfies a predetermined condition (e.g., a long-touch input is made on the letter for a predetermined time or more), the letter 'w' 221a may be underlined to be distinguishable from other letters.

According to various embodiments of the present disclosure, the electronic device may determine the letter 'w' 221a that the user's input behavior satisfies a predetermined condition, as a letter that is specified, on which the automatic word recommendation function is not to be performed. For example, the electronic device may perform the automatic word recommendation function only for the words that include 'w' at the position where the 'w' 221a is input. In other words, the electronic device may perform the automatic word recommendation function for a 4-letter word whose first letter starts with 'w'. As the automatic word recommendation function is performed for a 4-letter word(s) that starts with 'w' among the recommended words similar to the input word, words similar to the wkar 221 may be recommended in order of, for example, 'wise', 'what', and 'wide'.

When the automatic word recommendation function is utilized on the touch-based keypad of the electronic device, as the screen is smaller, the exact input may be more difficult. In this case, a large number of candidate words should be provided to allow the user to exactly select his/her intended word.

According to various embodiments of the present disclosure, the electronic device may perform the automatic word recommendation function for the remaining letters except for the letter(s) that the user's input behavior satisfies a predetermined condition when performing the automatic word recommendation function, so the number of candidate words may be reduced. Accordingly, it is possible to more easily recommend the word(s) intended by the user.

Figure 3:
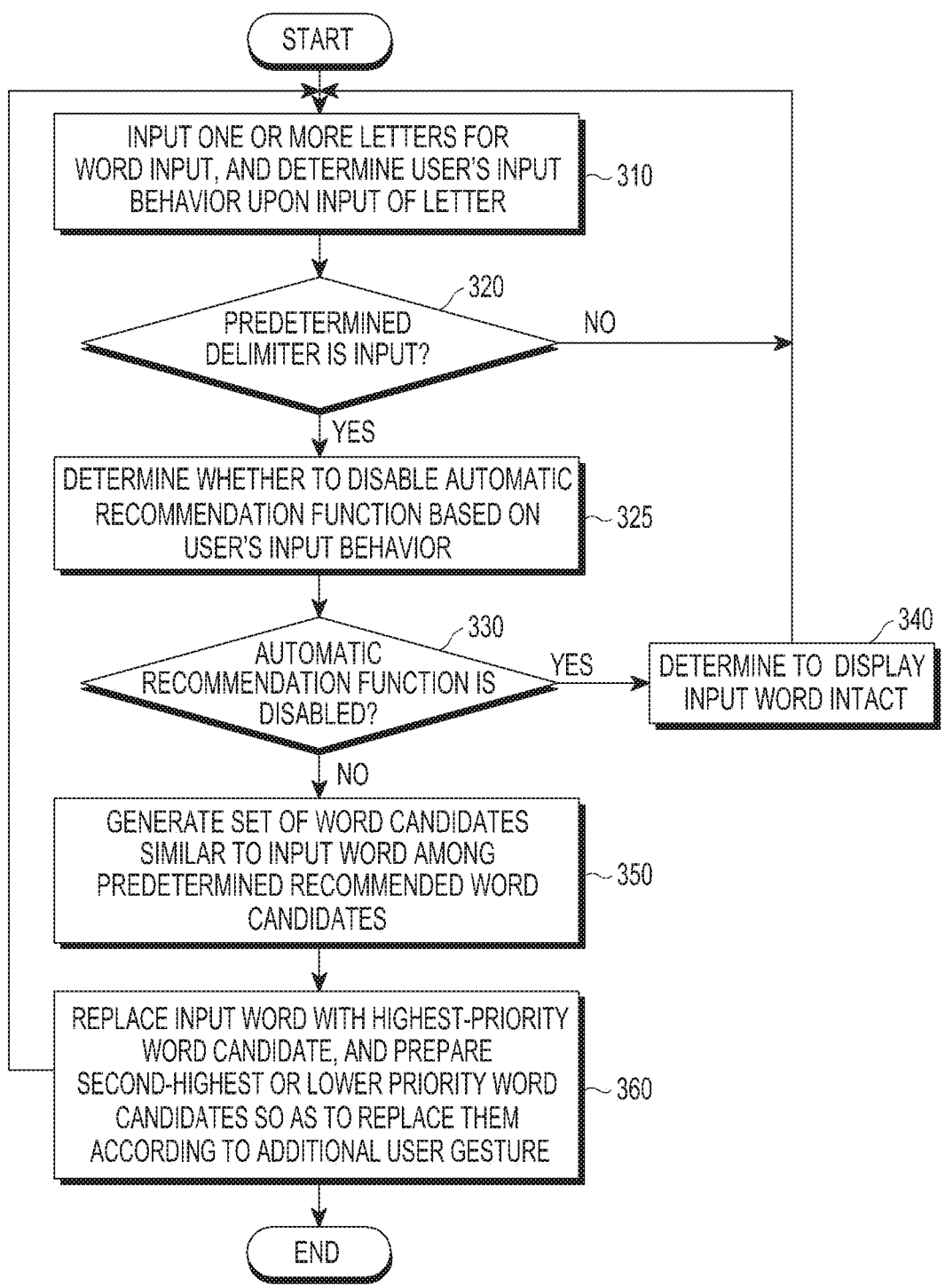
FIG. 3 is a flowchart illustrating an example of an operation of processing a word input in an electronic device according to an embodiment of the present disclosure.

FIG. 3 is a flowchart illustrating an example of an operation of processing a word input in an electronic device according to an embodiment of the present disclosure.

Referring to FIG. 3, in operation 310, the electronic device may detect an input of one or more letters (consonants or vowels) for a word input, and determine and record a user's input behavior upon the detection of an input of letters (consonants or vowels). For example, the letters may be input in units of letters, as the input language is English.

In operation 320, the electronic device may determine whether a predetermined delimiter is input. For example, the predetermined delimiter may be a letter code or character, which does not belong to a set of letters supported by the currently set language. For example, the delimiter may be a delimiter such as 'space', 'enter' and 'tab', a number/symbol, and letters constituting the other languages. If it is determined that no delimiter is input, the electronic device may return to operation 310.

If it is determined that a delimiter is input, the electronic device may determine in operation 325 whether to disable an automatic recommendation function, based on the user's input behavior. For example, the electronic device may disable the automatic recommendation function, upon determining a user's input behavior (e.g., a long-touch input is made on one or more letters) corresponding to a predetermined input duration or a size of an area where a touch input is made. For example, if it is determined in operation 310 that the recorded user's input behavior does not satisfy a predetermined condition, the electronic device may maintain the enabled automatic recommendation function or enable the disabled automatic recommendation function in operation 330.

In operation 330, the electronic device may determine whether the automatic recommendation function is disabled.

If the automatic recommendation function is disabled, then in operation 340, the electronic device may determine to display intact the word that is input in operation 310.

According to various embodiments of the present disclosure, the electronic device may determine to display the input word intact, even if (i) the touch input made in operation 310 is made with an area of a predetermined value or more, (ii) the touch input is detected as a predetermined gesture behavior, (iii) the touch input is held for a predetermined time or more, or (iv) the touch input is made with a pressure greater than or equal to a predetermined pressure.

If the automatic recommendation function is enabled, electronic device may generate a set of word candidates most similar to the input word among the predetermined recommended word candidates, in operation 350. For example, it will be assumed that a first word is input in operation 310, the first word includes a first letter and a second letter, and a predetermined user's input behavior is determined for the first letter and the second letter. A set of word candidates similar to the first word may include words that include the first letter and the second letter in the same position.

In operation 360, the electronic device may replace the input word with a highest-priority candidate word, and display the replaced word.

According to various embodiments of the present disclosure, the electronic device may further display a word candidate with the next-highest priority in response to the additional user gesture (e.g., swipe).

For example, according to various embodiments of the present disclosure, a method for processing a letter input in an electronic device may include, if at least one letter is input, determining at least one input behavior related to the input; and if a predetermined delimiter is input, determining whether to disable a function of automatically recommending at least one word similar to an input word, based on the determined input behavior.

The method may further include displaying the input word intact, if at least one predetermined user's input behavior for the at least one word is determined.

The method may further include determining an input of a first word including a first letter and a second letter, and if a user's input behavior for the first letter and the second letter is determined, recommending at least one word among words that include the first letter and the second letter in the same position, as a word similar to the first word. The at least one input behavior may include at least one of a time for which a touch is held for an input, a touch pressure, a contact area, and a behavior of a gesture.

The method may further include displaying the input word intact, if the touch for an input is held for a predetermined time or longer.

The method may further include displaying the input word intact, if the touch for an input is made with a pressure greater than or equal to a predetermined value.

The method may further include displaying the input word intact, if the touch for an input is made with an area greater than or equal to a predetermined value.

The method may further include displaying the input word intact, if a predetermined behavior is detected from the touch for an input.

The method may further include expanding the touched keypad area or a perimeter of the touched keypad area with a predetermined value or more, if a touch in a keypad area is held for a predetermined or more.

Figure 4:
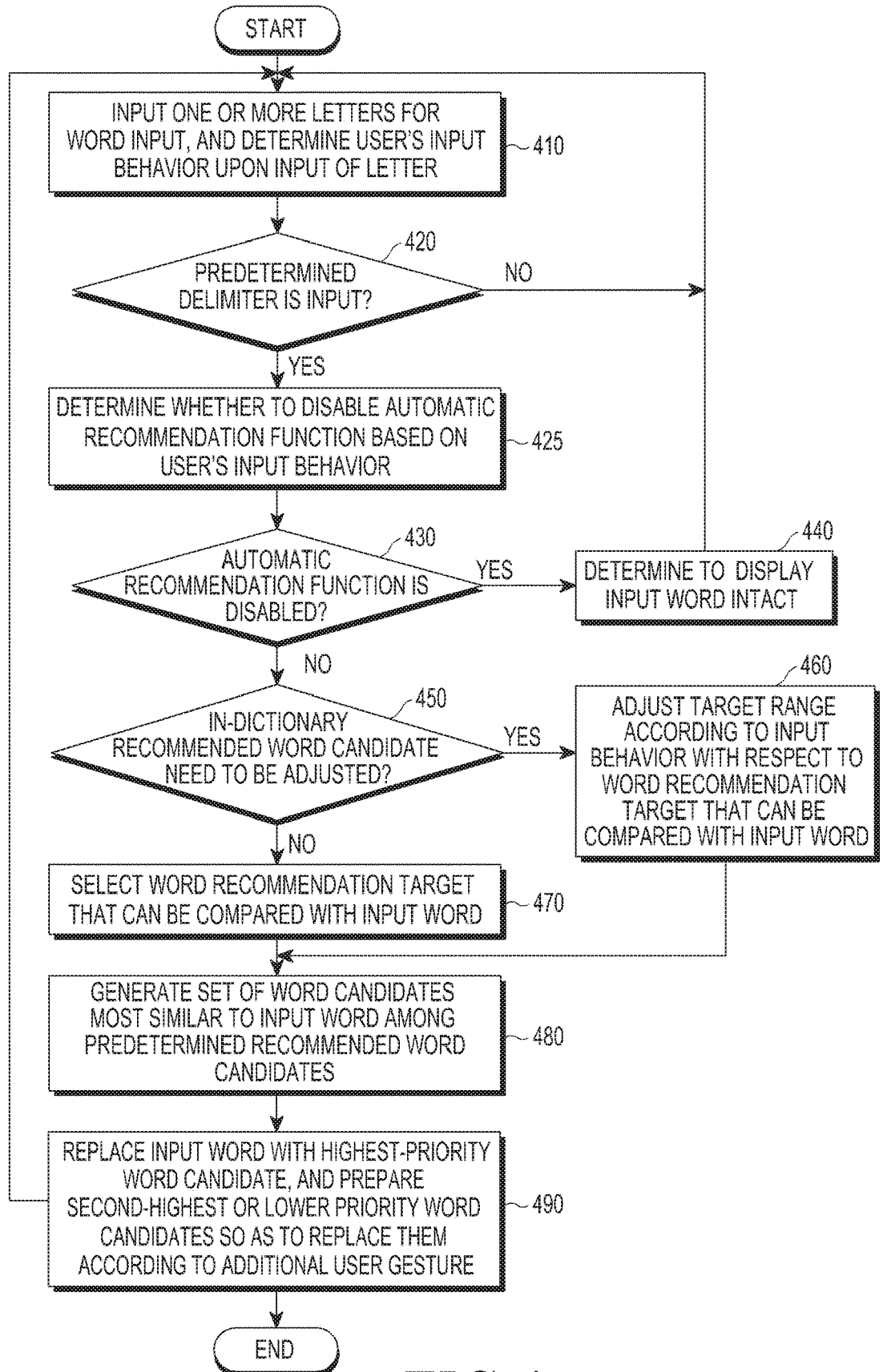
FIG. 4 is a flowchart illustrating an example of an operation of processing a word input in an electronic device according to an embodiment of the present disclosure.

FIG. 4 is a flowchart illustrating an example of an operation of processing a word input in an electronic device according to an embodiment of the present disclosure.

Referring to FIG. 4, in operation 410, the electronic device may detect an input of one or more letters (consonants or vowels) for a word input, and determine and record a user's input behavior upon the detection of an input of letters (consonants or vowels). For example, the letters may be input in units of letters, as the input language is English.

In operation 420, the electronic device may determine whether a predetermined delimiter is input. If it is determined that no delimiter is input, the electronic device may return to operation 410.

If it is determined that a delimiter is input, the electronic device may determine in operation 425 whether to disable an automatic recommendation function, based on the user's input behavior. For example, the electronic device may disable the automatic recommendation function, upon determining a user's input behavior (e.g., a long-touch input is made on one or more letters) corresponding to a predetermined input duration or a size of an area where a touch input is made. For example, if it is determined in operation 410 that the recorded user's input behavior does not satisfy a predetermined condition, the electronic device may maintain the enabled automatic recommendation function or enable the disabled automatic recommendation function in operation 430.

In operation 430, the electronic device may determine whether the automatic recommendation function is disabled.

If the automatic recommendation function is disabled, the electronic device may determine in operation 440 to display the word that is input in operation 410 intact.

If the automatic recommendation function is enabled, the electronic device may determine in operation 450 whether recommended word candidates in a dictionary are required to be adjusted.

For example, if a user's input behavior is determined for at least one of the input consonant or vowel, the electronic device may adjust the target range according to the input behavior with respect to the word recommendation target that can be compared with the input word, in operation 460. For example, if at least one letter including a user's input behavior among the input letters is determined, the electronic device may exclude the at least one letter whose input behavior is determined, from the word recommendation target. The electronic device may consider the word including the letter to be excluded from the word recommendation target, as a range of the target on which the automatic recommendation function is to be performed.

On the other hand, if a user's input behavior is not determined for at least one of the input consonant or vowel, the electronic device may select a word recommendation target that can be compared with the input word, based on the input letters in operation 470.

In operation 480, the electronic device may generate a set of word candidates most similar to the input letters among the predetermined recommended word candidates.

In operation 490, the electronic device may replace the input word with a highest-priority candidate word, and display the replaced word.

According to various embodiments of the present disclosure, the electronic device may further display a word candidate with the next-highest priority in response to the additional user gesture (e.g., swipe).

Figure 5A:
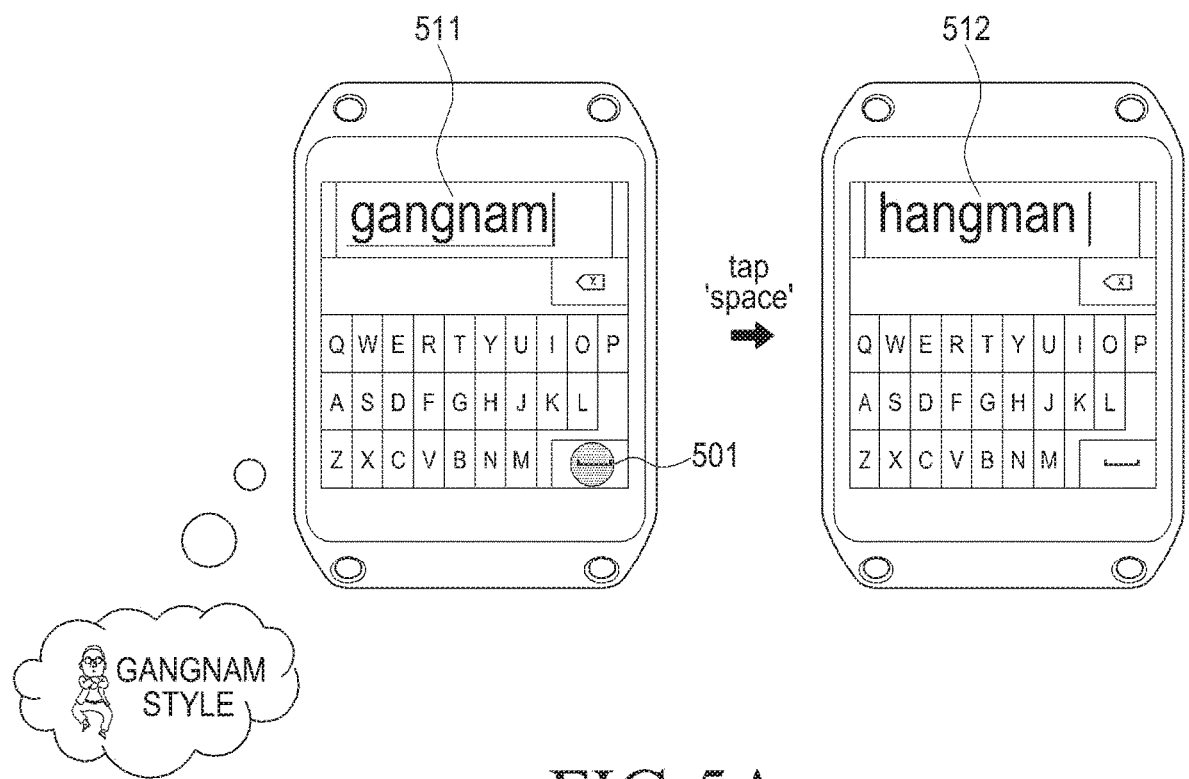
FIGS. 5A and 5B illustrate an example of an operation of processing a word input on a screen in an electronic device according to various embodiments of the present disclosure.
Figure 5B:
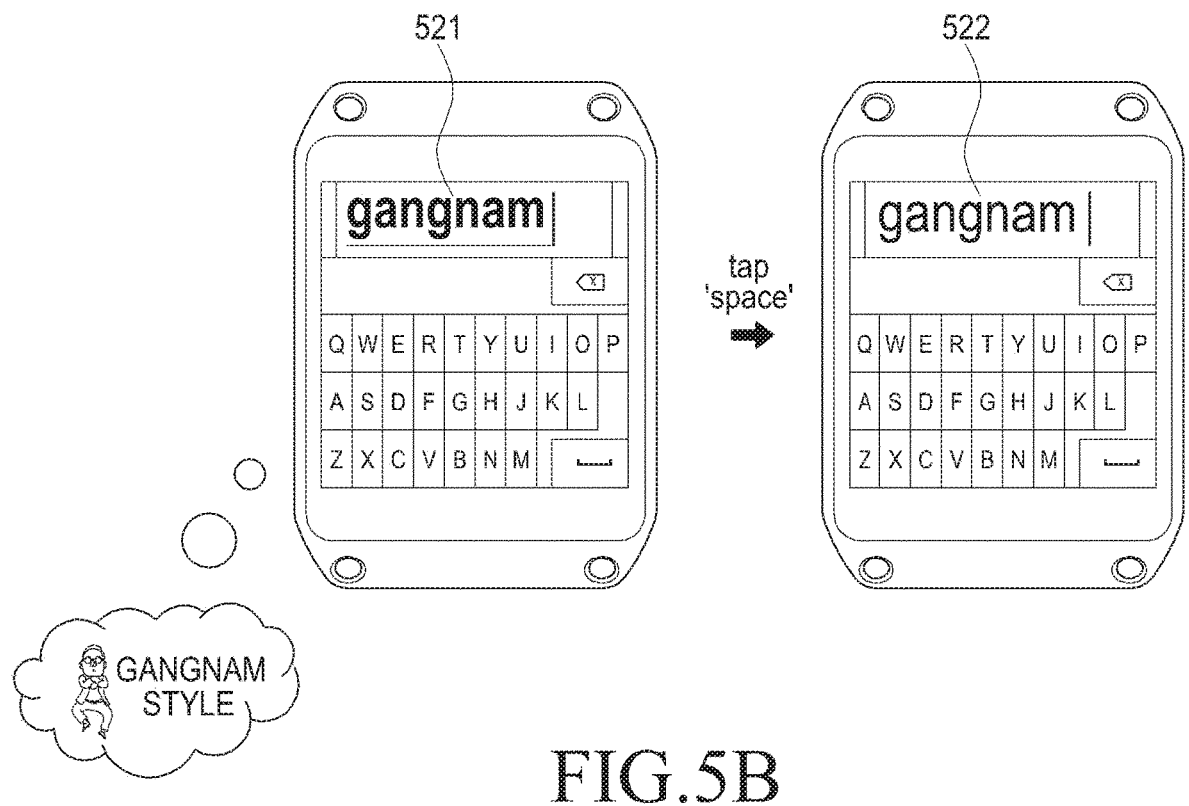

FIGS. 5A and 5B illustrate an example of an operation of processing a word input on a screen in an electronic device according to various embodiments of the present disclosure.

In the electronic device, the automatic word recommendation function may be performed, if a delimiter (e.g., a space) 501 is input after a word is input through an input interface (e.g., a touch keypad).

Referring to FIG. 5A, the user has input 'gangnam' 511. Thereafter, if the user inputs a predetermined delimiter (e.g., a space 501), the automatic word recommendation function may be performed, so 'gangnam' 511 may be automatically changed to 'hangman' 512. For example, the 'gangnam' 511 is a proper noun, and if such a word that is not registered in the dictionary is input, the input word may be changed or modified to a word that is most similar to the input word and registered in the dictionary. Accordingly, the user may perform an additional action for re-inputting his/her originally intended 'gangnam' 511. For example, the additional action may include an operation of deleting the automatically changed word and re-inputting the user intended word, or an operation of disabling the automatic word recommendation function.

According to various embodiments of the present disclosure, the electronic device may further determine a user's input behavior upon detecting the input of a word.

Referring to FIG. 5B, the electronic device may display 'gangnam' 522, maintaining 'gangnam' 521 intact, even if the predetermined delimiter (e.g., the space 501) is input, in a case where a long-touch input is made on at least one consonant or vowel for a predetermined time or more during an input of at least one letter (e.g., consonant or vowel) constituting the 'gangnam' 521, or in a case where the total input time of the input word exceeds a predetermined time. In other words, even though the electronic device has determined an input of a delimiter after a word input, the electronic device may disable the automatic word recommendation function for the determined word, if the user's input behavior satisfies a predetermined condition.

Figure 6A:
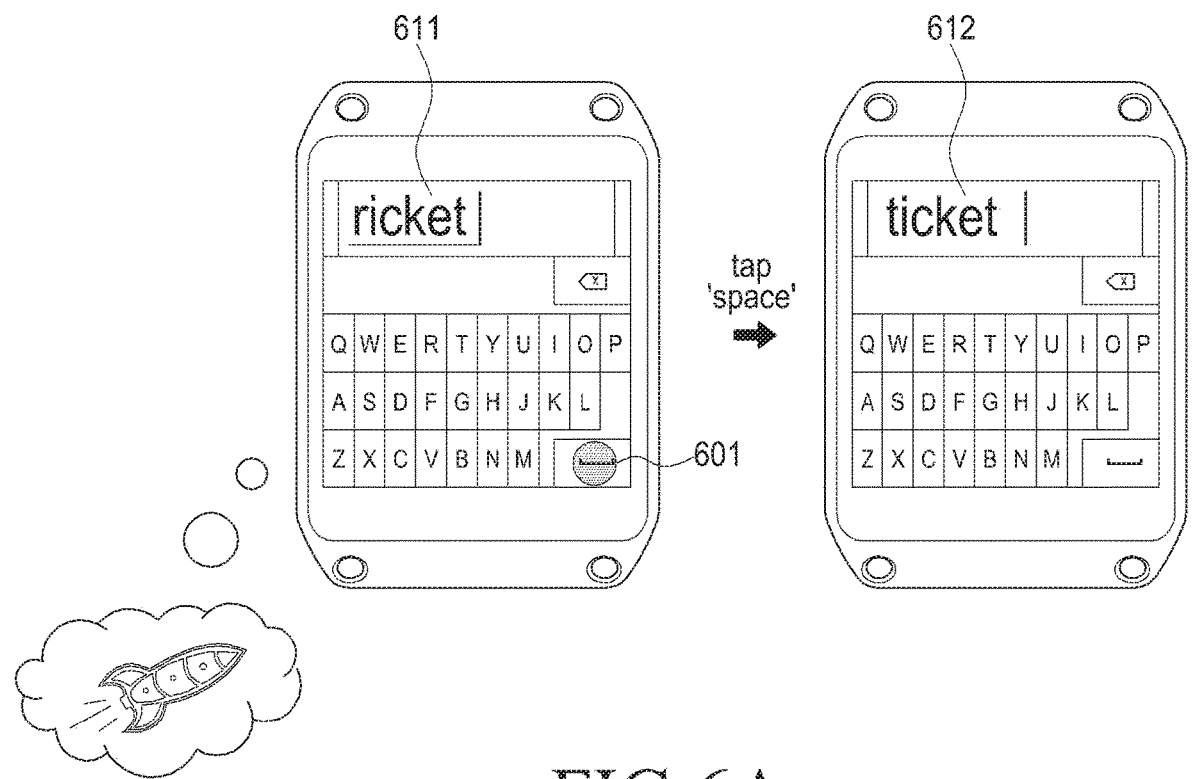
FIGS. 6A and 6B illustrate an example of an operation of processing a word input on a screen in an electronic device according to various embodiments of the present disclosure.
Figure 6B:
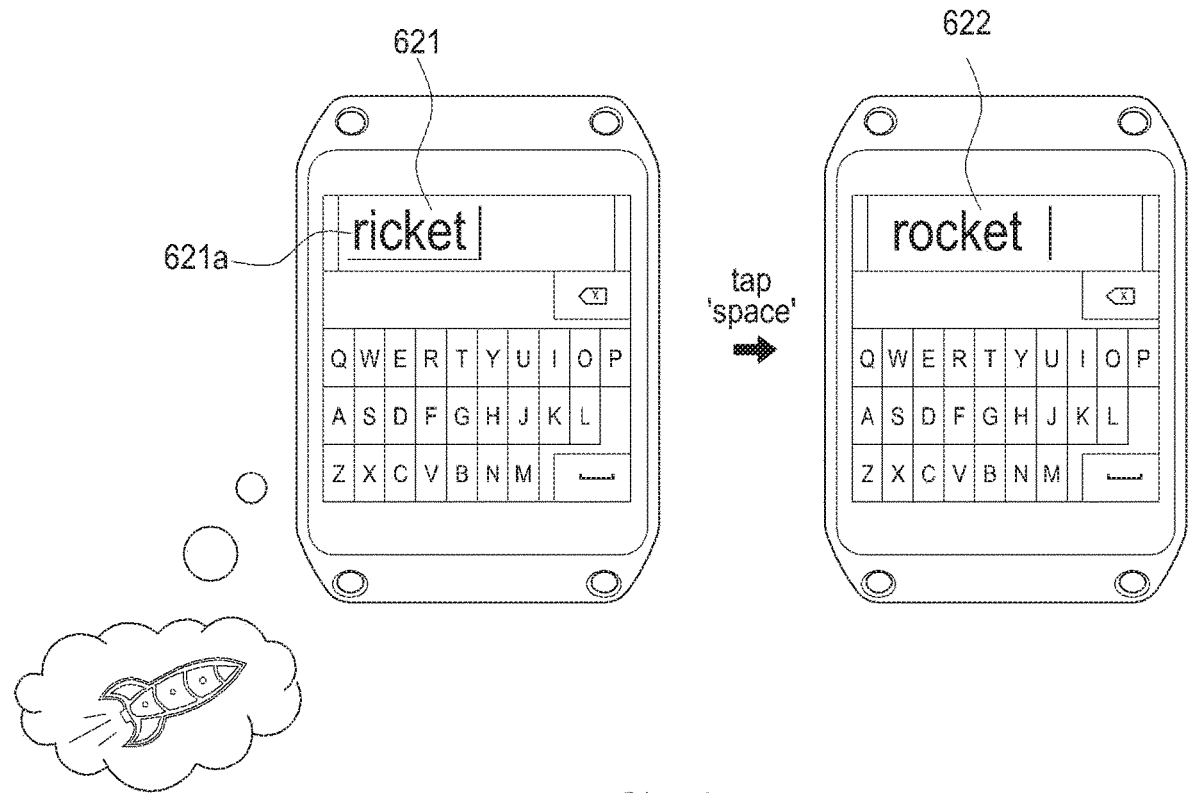

FIGS. 6A and 6B illustrate an example of an operation of processing a word input on a screen in an electronic device according to various embodiments of the present disclosure. In the electronic device, the automatic word recommendation function may be performed, if a delimiter is input after a word is input through an input interface (e.g., a touch keypad).

Referring to FIG. 6A, it will be assumed that the user has input 'ricket' 611. Thereafter, if the user taps (or inputs) a space 601, the automatic word recommendation function may be performed, so the 'ricket' 611 may be automatically changed to 'ticket' 612. For example, the 'ricket' 611, which is a word that is not registered in the dictionary, may be changed or modified to 'ticket' 612, which is a word that is most similar to the input word and registered in the dictionary.

On the other hand the user might have originally intended to input 'rocket', and might have wrongly input 'o' as 'i'.

According to various embodiments of the present disclosure, the user may determine a user's input behavior (e.g., a long-touch input is made) with respect to 'r' 621a. Thereafter, if a predetermined delimiter (e.g., a space) is input, the electronic device may determine the user's input behavior for 'r' 621a, and perform the automatic word recommendation function of recommending a word most similar to the 'ricket' 621 among the words that include the 'r' 621a as a first letter. For example, the 'ricket' 621 may be automatically changed or modified to 'rocket' 622, and then displayed.

Figure 7A:
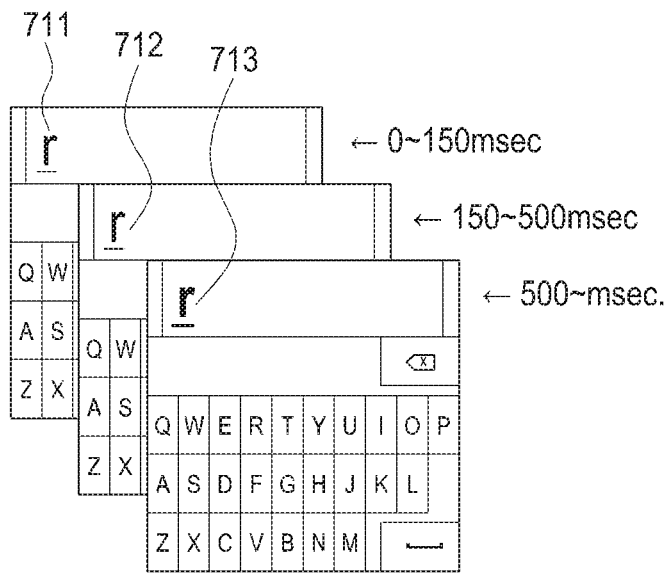
FIGS. 7A and 7B illustrate an example of an operation of processing a word input on a screen in an electronic device according to various embodiments of the present disclosure.
Figure 7B:
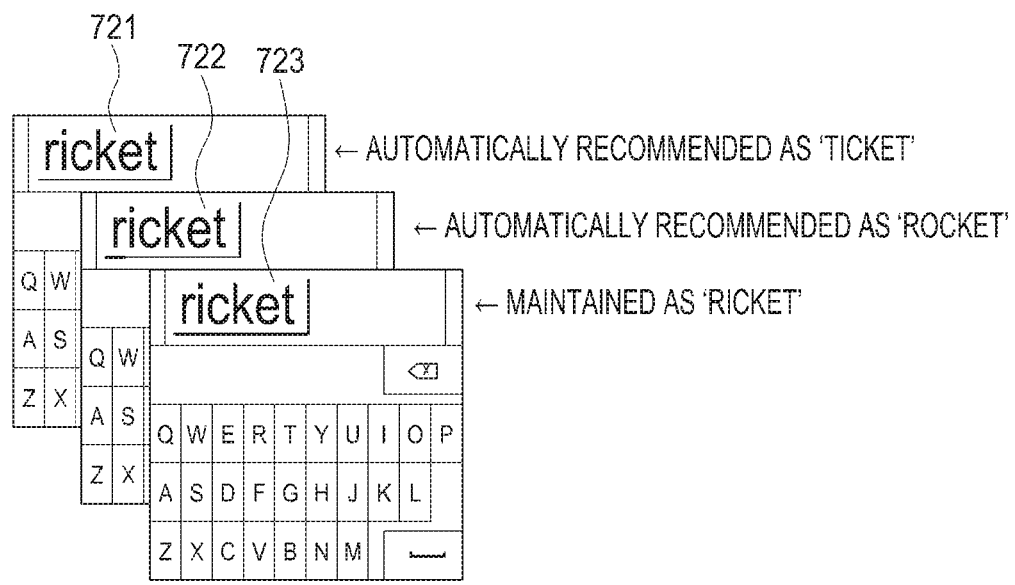

FIGS. 7A and 7B illustrate an example of an operation of processing a word input on a screen in an electronic device according to various embodiments of the present disclosure.

Referring to FIG. 7A, the user has input 'r'. For example, the electronic device may determine a user's input behavior upon the input of 'r'.

For example, it will be assumed that 'r' 711 has been touched for 0~150 msec (short touch), 'r' 712 has been touched for 150~500 msec (medium touch), and 'r' 713 has been touched for 500 msec or more (long touch). The electronic device may determine whether to perform the automatic word recommendation function for a word including the 'r' depending on the time for which the 'r' has been touched.

Although the durations corresponding to the short touch, the medium touch and the long touch have been exemplified as values corresponding to 0~150 msec, 150~500 msec, and 500 msec or more, respectively, according to various embodiments of the present disclosure, the values may be changed depending on the user's settings or the circumstances at the time of manufacturing.

Referring to FIG. 7B, the electronic device may change the range of the automatic word recommendation target or disable the automatic word recommendation function depending on the touch duration.

For example, the electronic device may enable the automatic word recommendation function for a word (e.g., ricket) 721 including 'r' 711 corresponding to the short touch.

For example, the electronic device may enable the automatic word recommendation function only for the word that includes the 'r' 712 as a first letter, with respect to the word (e.g., ricket) 722 including the 'r' 712 corresponding to the medium touch.

For example, the electronic device may disable the automatic word recommendation function for the word (e.g., ricket) 723 including the 'r' 713 corresponding to the long touch. In this case, the 'ricket' 723 including the long-touched 'r' 713 may be displayed intact.

Figure 8A:
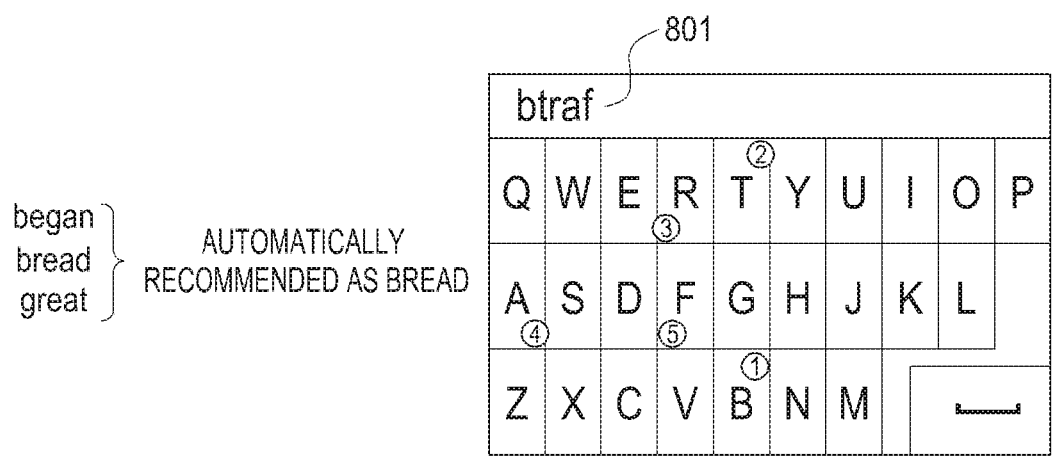
FIGS. 8A and 8B illustrate an example of an automatic word recommendation function in an electronic device according to various embodiments of the present disclosure.
Figure 8B:
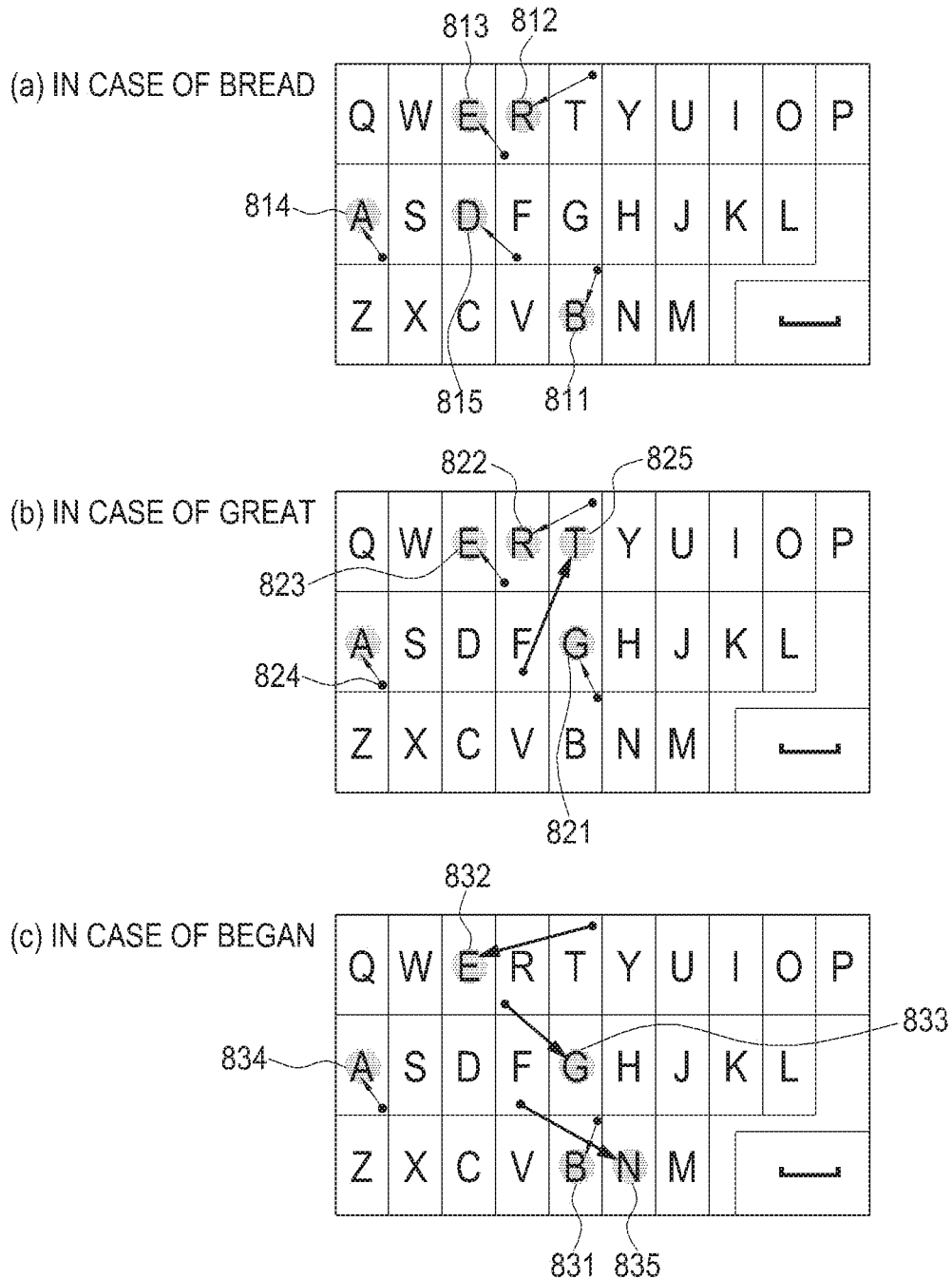

FIGS. 8A and 8B illustrate an example of an automatic word recommendation function in an electronic device according to various embodiments of the present disclosure.

Referring to FIG. 8A, the user has input 'btraf' 801 through a keypad of the electronic device. For example, letters of the 'btraf' 801 may be displayed, as their associated touches are detected in the positions corresponding to 'b' ①, 't' ②, 'r' ③, 'a' ④ and 'f' ⑤.

The electronic device may calculate a gap between each letter and the letter's adjacent letters, and may recommend a word most similar to the input 'btraf' 801 taking into account the frequency of use of the word. For example, in FIG. 8A, 'bread', 'great' and 'began' have been recommended as the words most similar to the 'btraf' 801.

Referring to (a) in FIG. 8B, the electronic device may compare 'btraf' 801 with 'bread'. The electronic device may measure a gap between each of 'b' ①, 't' ②, 'r' ③, 'a' ④ and 'f' ⑤ and each of 'b' 811, 'r' 812, 'e' 813', 'a' 814 and 'd' 815.

Referring to (b) in FIG. 8B, the electronic device may compare 'btraf' 801 with 'great'. The electronic device may measure a gap between each of 'b' ①, 't' ②, 'r' ③, 'a' ④ and 'f' ⑤ and each of 'g' 821, 'r' 822, 'e' 823, 'a' 824', 't' 825.

Referring to (c) in FIG. 8B, the electronic device may compare 'btraf' 801 with 'began'. The electronic device may measure a gap between each of 'b' ①, 't' ②, 'r' ③, 'a' ④ and 'f' ⑤ and each of 'b' 831, 'e' 832, 'g' 833, 'a' 834' and 'n' 835.

As a result of the measurement, 'bread' may be measured as a word that is closest to the input 'btraf' 801, and highest in the frequency of use. Accordingly, the input 'btraf' 801 may be automatically changed or modified to 'bread' and displayed depending on the automatic word recommendation function.

Figure 9A:
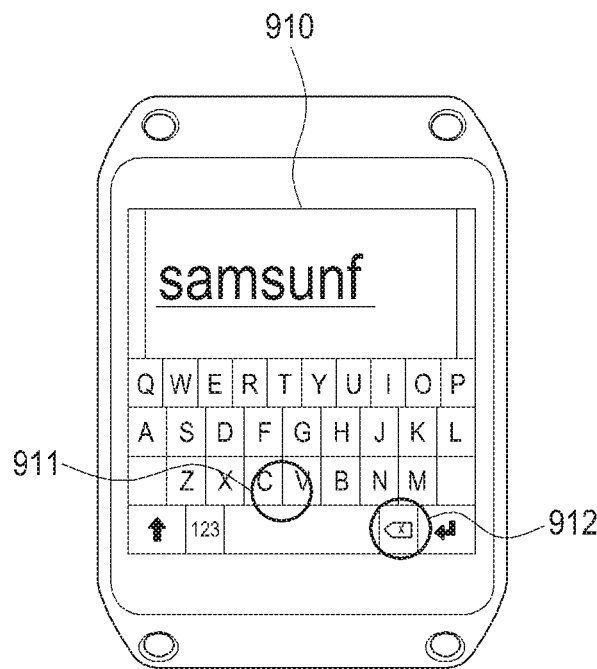
FIGS. 9A and 9B illustrate an example of a screen provided for a word input according to various embodiments of the present disclosure.
Figure 9B:
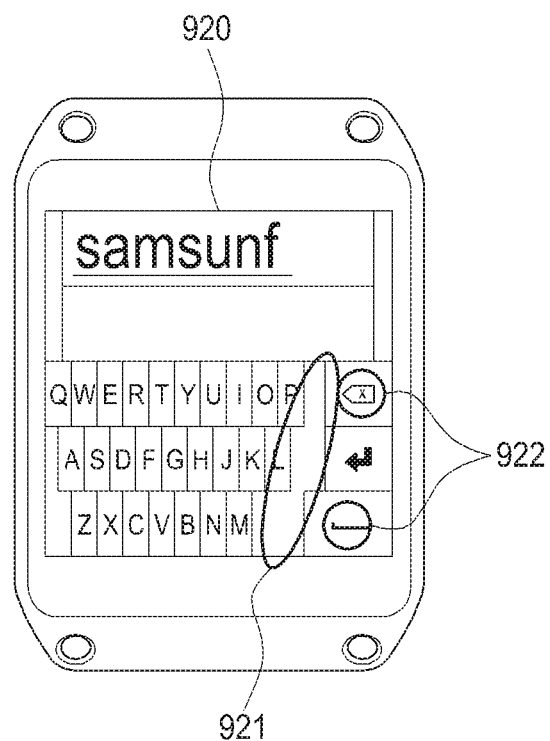

FIGS. 9A and 9B illustrate an example of a screen provided for a word input according to various embodiments of the present disclosure.

Referring to FIG. 9A, a space key 911 is adjacent to letter keys in a screen 910. If the user applies an input to a letter key, the input may be applied to the space key 911, unlike the user's intention. Accordingly, the automatic word recommendation function may be performed before the word input is terminated. In a case where a backspace key 912 is adjacent to letter keys as in the arrangement of the backspace key 912, even though the user has typed or tapped a letter key to input a letter, an input may be applied to the backspace key 912, so the previously input letter may be deleted.

According to various embodiments of the present disclosure, letter keys and special keys 922 (e.g., a space key or a backspace key) may be arranged separately in the electronic device.

Referring to a screen 920 in FIG. 9B, an area of letter keys and an area of special keys 922 may be separated, and an empty space 921 may be provided between the areas. For example, the empty space 921 may be configured as a space where an operation related to a letter input is not performed in response to any input.

For example, as the letter keys and the special keys 922 are separated by the empty space 921, the user is unlikely to type or input the special keys 922 unintentionally.

Figure 10A:
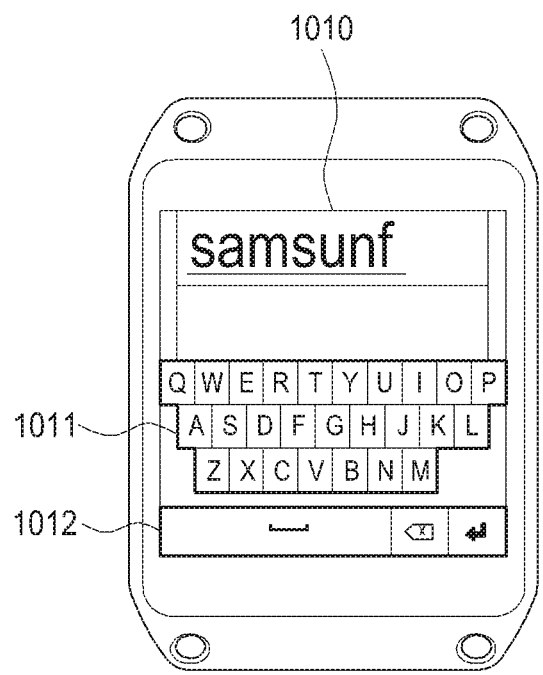
FIGS. 10A and 10B illustrate an example of a screen provided for a word input according to various embodiments of the present disclosure.
Figure 10B:
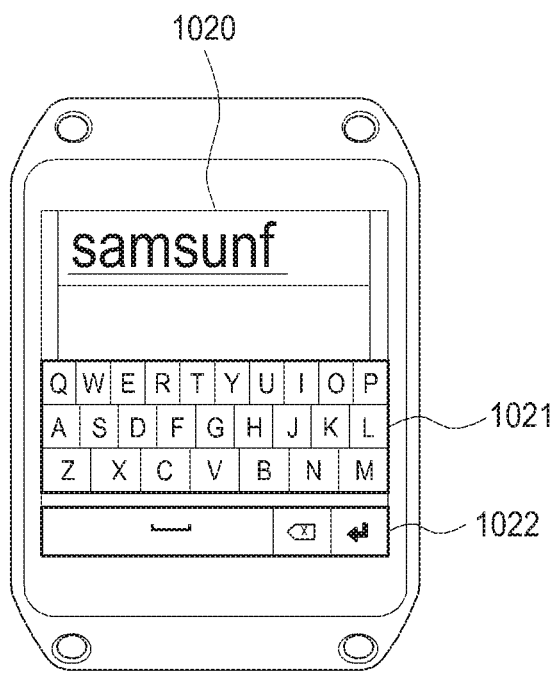

FIGS. 10A and 10B illustrate an example of a screen provided for a word input according to various embodiments of the present disclosure.

Referring to FIGS. 10A and 10B, the electronic device may display an area of letter keys separately from an area of special keys.

Referring to a screen 1010 in FIG. 10A, an area 1011 of letter keys and an area 1012 of special keys may be separated by the empty space.

According to various embodiments of the present disclosure, the position or size of the keys in the area 1011 may be set depending on the user's input direction.

Referring to a screen 1020 in FIG. 10B, an area 1021 of letter keys and an area 1022 of special keys may be separated by the empty space.

According to various embodiments of the present disclosure, the position or size of the keys in the area 1021 may be set so as not to waste the horizontal width of the screen 1020.

Figure 11A:
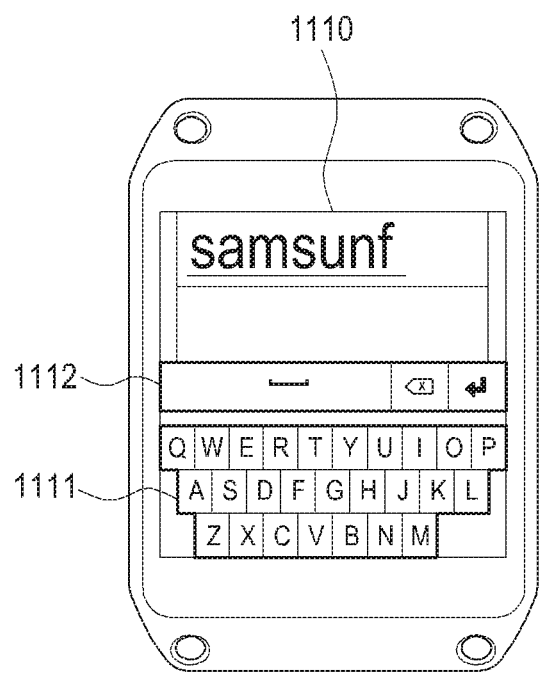
FIGS. 11A and 11B illustrate an example of a screen provided for a word input according to various embodiments of the present disclosure.
Figure 11B:
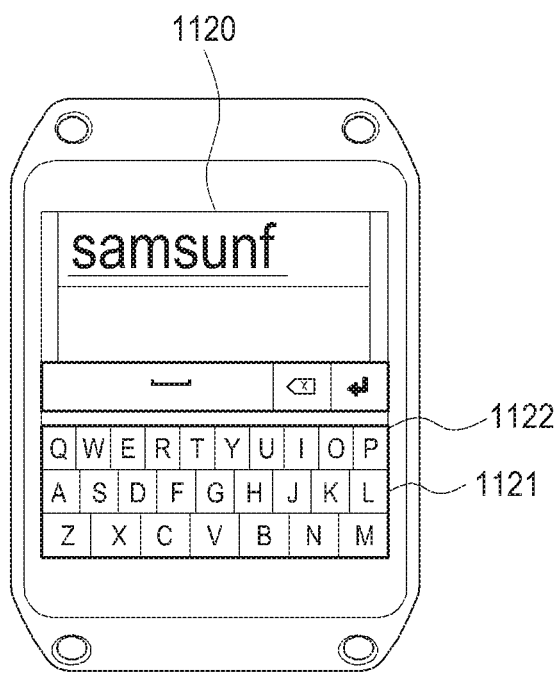

FIGS. 11A and 11B illustrate an example of a screen provided for a word input according to various embodiments of the present disclosure.

Referring to FIGS. 11A and 11B, the electronic device may separately display an area of letter keys and an area of special keys.

Referring to a screen 1110 in FIG. 11A, an area 1111 of letter keys and an area 1112 of special keys may be separated by the empty space.

According to various embodiments of the present disclosure, the area 1111 of letter keys may be set under the area 1112 of special keys depending on the user's convenience.

Referring to a screen 1120 in FIG. 11B, the area 1121 of letter keys and the area 1122 of special keys may be separated by the empty space.

According to various embodiments of the present disclosure, the area 1121 of letter keys may be set under the area 1122 of special keys depending on the user's convenience. The position or size of the keys in the area 1121 may be set so as not to waste the horizontal width of the screen 1120.

Figure 12:
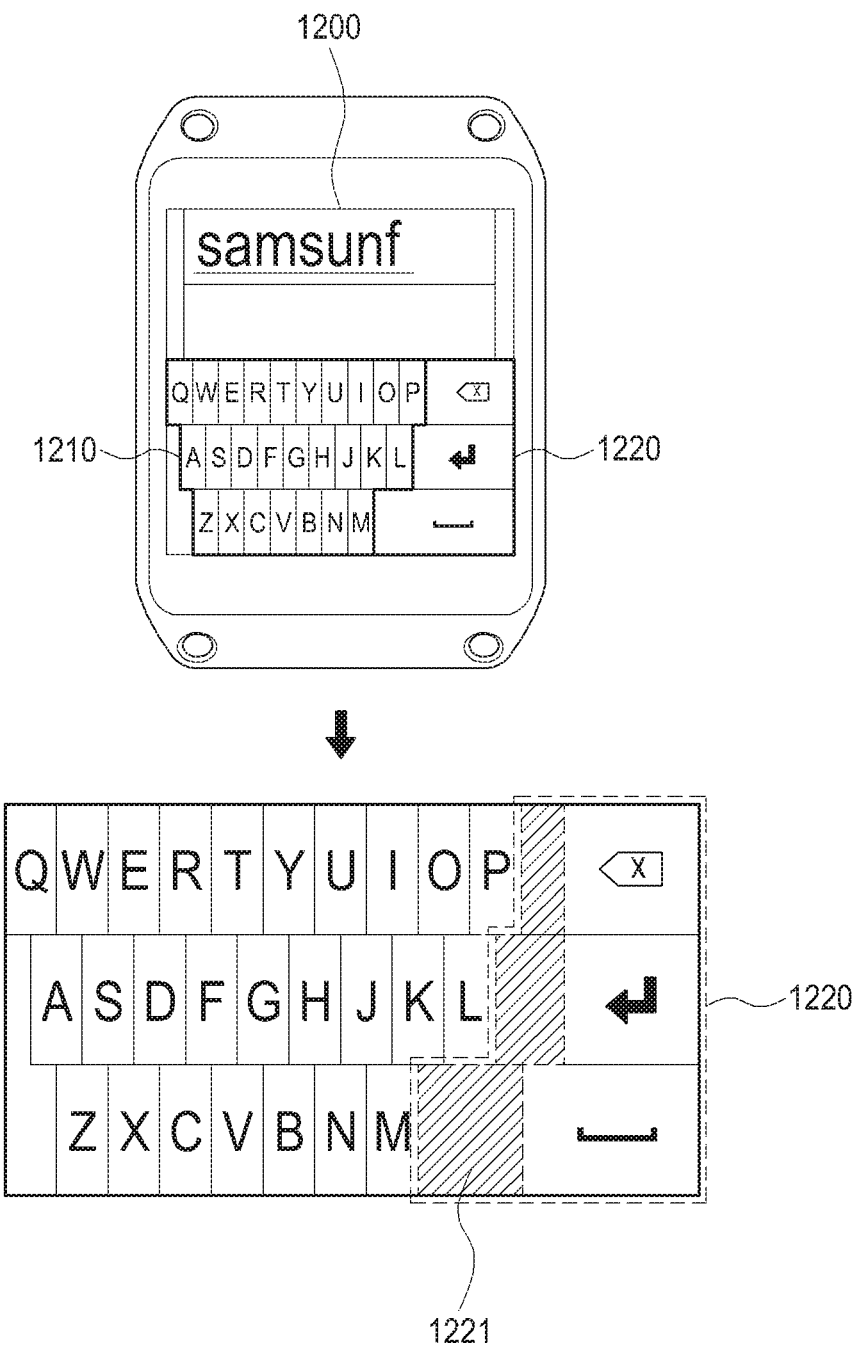
FIG. 12 illustrates an example of a screen provided for a word input according to an embodiment of the present disclosure.

FIG. 12 illustrates an example of a screen provided for a word input according to various embodiments of the present disclosure.

Referring to FIG. 12, a screen 1200 may be set so that an area 1210 of letter keys and an area 1220 of special keys may be separated.

Although the area 1210 of letter keys and the area 1220 of special keys are illustrated to be adjacent to each other on the screen 1200 according to various embodiments of the present disclosure, some of the area 1220 of special keys 1220 may actually include a void area 1221.

For example, if the void area 1221 in the area 1220 of special keys is touched by the user, the electronic device may ignore the touch, or consider that a letter key most adjacent to the touched area is input.

Figure 13:
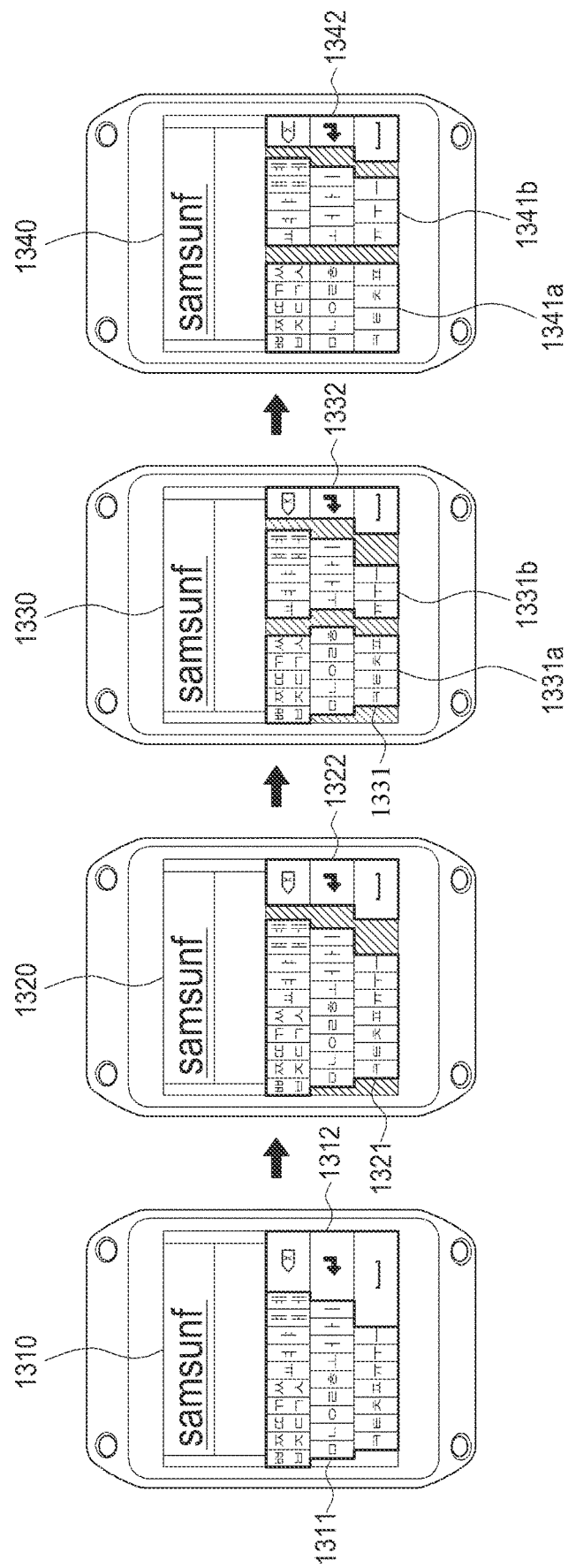
FIG. 13 illustrates an example of a screen provided for a word input according to an embodiment of the present disclosure.

FIG. 13 illustrates an example of a screen provided for a word input according to various embodiments of the present disclosure.

Referring to FIG. 13, according to various embodiments of the present disclosure, the electronic device may separate an area of letter keys and an area of special keys depending on the input language (e.g., Korean) in which a word is input, and a screen for a letter input may be provided so that the area of letter keys may be separated again into an area of consonant keys and an area of vowel keys.

Referring to a screen 1310, although an area 1311 of letter keys and an area 1312 of special keys are separated, the area 1311 of letter keys and the area 1312 of special keys are arranged adjacent to each other. Thus, an error may occur during an input between the letter keys and the special keys.

According to various embodiments of the present disclosure, referring to a screen 1320, an empty space may be set between an area 1321 of letter keys and an area 1322 of special keys.

According to various embodiments of the present disclosure, referring to a screen 1330, an empty space may be set between an area of letter keys and an area 1332 of special keys. The area of letter keys 1331 may be separated again into an area 1331a of consonant keys and an area 1331b of vowel keys, and an empty space may be set between the area 1331a of consonant keys and the area 1331b of vowel keys.

According to various embodiments of the present disclosure, referring to a screen 1340, an empty space may be set between an area of letter keys and an area 1342 of special keys. The area of letter keys may be separated again into an area 1341a of consonant keys and an area 1341b of vowel keys, and an empty space may be set between the area 1341a of consonant keys and the area 1341b of vowel keys.

According to various embodiments of the present disclosure, the area 1341a of consonant keys and the area 1341b of vowel keys may be rearranged so that the vertical width may not be wasted in the area where keys are arranged.

Figure 14A:
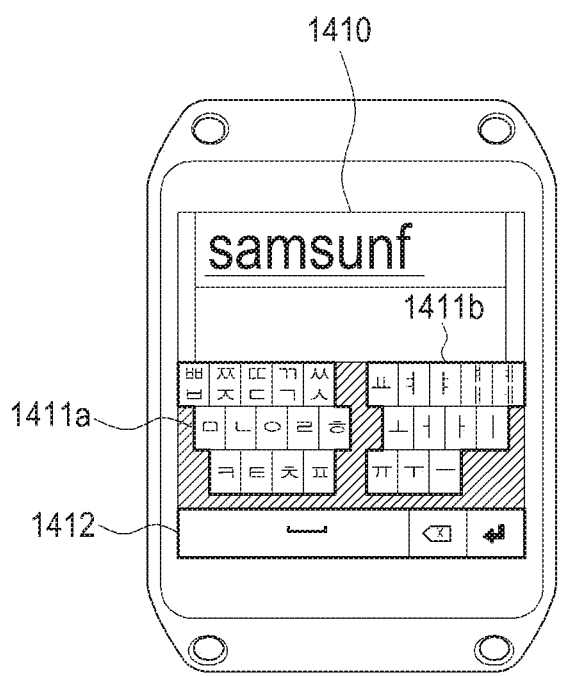
FIGS. 14A and 14B illustrate an example of a screen provided for a word input according to various embodiments of the present disclosure.
Figure 14B:
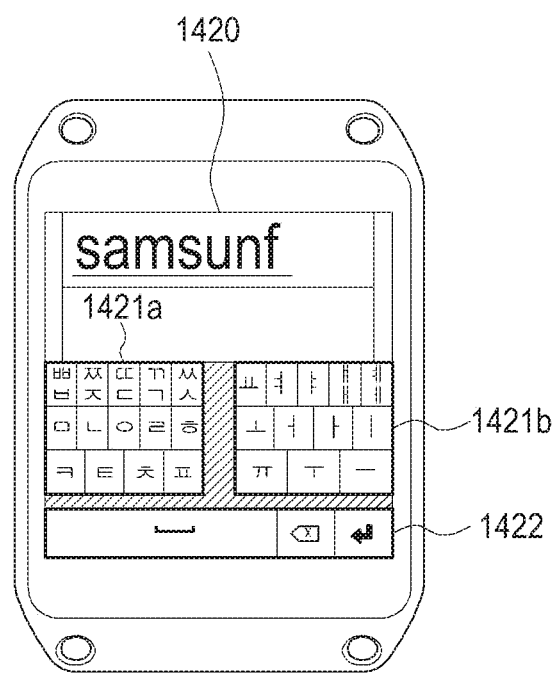

FIGS. 14A and 14B illustrate an example of a screen provided for a word input according to various embodiments of the present disclosure.

Referring to FIGS. 14A and 14B, according to various embodiments of the present disclosure, the electronic device may separate an area of letter keys and an area of special keys depending on the input language (e.g., Korean) in which a word is input. A screen for a letter input may be provided so that the area of letter keys may be separated again into an area of consonant keys and an area of vowel keys.

Referring to a screen 1410 in FIG. 14A, an area 1412 of special keys may be arranged under an area of letter keys, which includes an area 1441a of consonant keys and an area 1441b of vowel keys.

Referring to a screen 1420 in FIG. 14B, an area 1421a of consonant keys and an area 1421b of vowel keys may be rearranged so that the vertical width may not be wasted in the area where keys are arranged.

Figure 15:
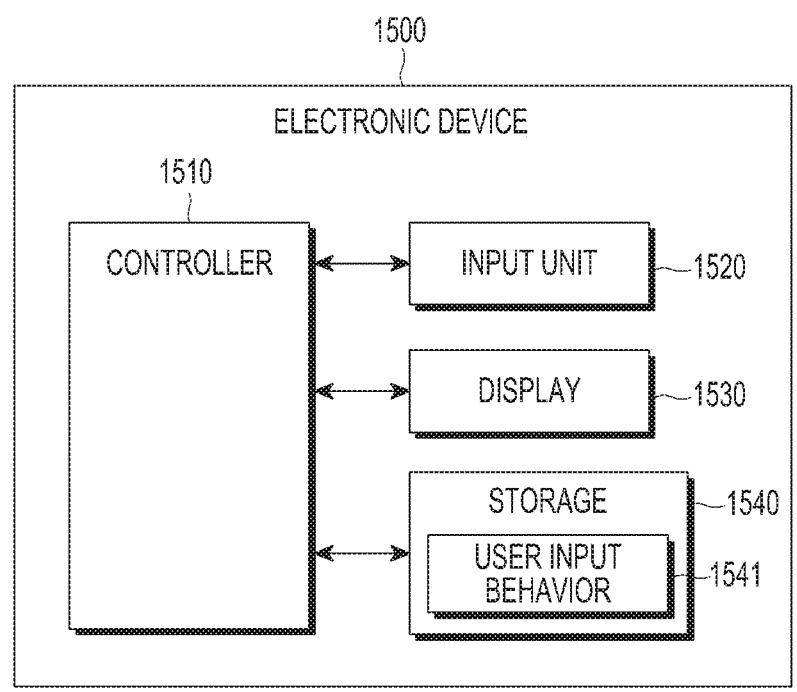
FIG. 15 is a block diagram illustrating an example of a structure of an electronic device according to an embodiment of the present disclosure.

FIG. 15 is a block diagram illustrating an example of a structure of an electronic device according to an embodiment of the present disclosure.

Referring to FIG. 15, an electronic device 1500 may include a controller 1510, an input unit 1520, a display 1530, and a storage 1540.

The controller 1510 may control the overall operation of the electronic device 1500.

According to various embodiments of the present disclosure, the controller 1510 may determine an input behavior for at least one letter, and determine whether to disable an automatic word recommendation function depending to the determination results. For example, the controller 1510 may perform the above-described operation shown in FIG. 3 or 4.

The input unit 1520 may include an interface for receiving a user's input.

Although the input unit 1520 and the display 1530 are shown as separate components, the input unit 1520 may be configured by software to be implemented through the display 1530 according to various embodiments of the present disclosure. In this case, the input unit 1520 is optional.

The display 1530 may include a touch panel to which a user's input is applied. The display 1530 may display a letter based on a user gesture that is detected through the touch panel. The keypad according to various embodiments of the present disclosure may include keys corresponding to letters for a letter input with respect to various languages, and special keys such as a space key and a backspace key.

The storage 1540 may store a user's input behavior 1541. According to various embodiments of the present disclosure, if a letter is input, a user's input behavior for the letter may be stored in the storage 1540.

For example, an electronic device according to various embodiments of the present disclosure may include an input unit; and a controller configured to, if at least one letter is input through the input unit, determine at least one input behavior related to the input, and if a predetermined delimiter is input, determine whether to disable a function of automatically recommending at least one word similar to an input word, based on the determined input behavior.

The electronic device may further include a display, and if at least one predetermined user's input behavior for the at least one word is determined, the controller may control the display to display the input word intact.

The controller may determine an input of a first word including a first letter and a second letter, and if a user's input behavior for the first letter and the second letter is determined, the controller may recommend at least one word among words that include the first letter and the second letter in the same position, as a word similar to the first word.

The at least one input behavior may include at least one of a time for which a touch is held for an input, a touch pressure, a contact area, and a behavior of a gesture.

If the touch for an input is held for a predetermined time or more, the controller may control the display to display the input word intact.

If the touch for an input is made with a pressure greater than or equal to a predetermined value, the controller may control the display to display the input word intact.

If the touch for an input is made with an area greater than or equal to a predetermined value, the controller may control the display to display the input word intact.

If a predetermined behavior is detected from the touch for an input, the controller may control the display to display the input word intact.

If a touch in a keypad area is held for a predetermined or more, the controller may control the display to expand the touched keypad area or a perimeter of the touched keypad area with a predetermined value or more.

Figure 16:
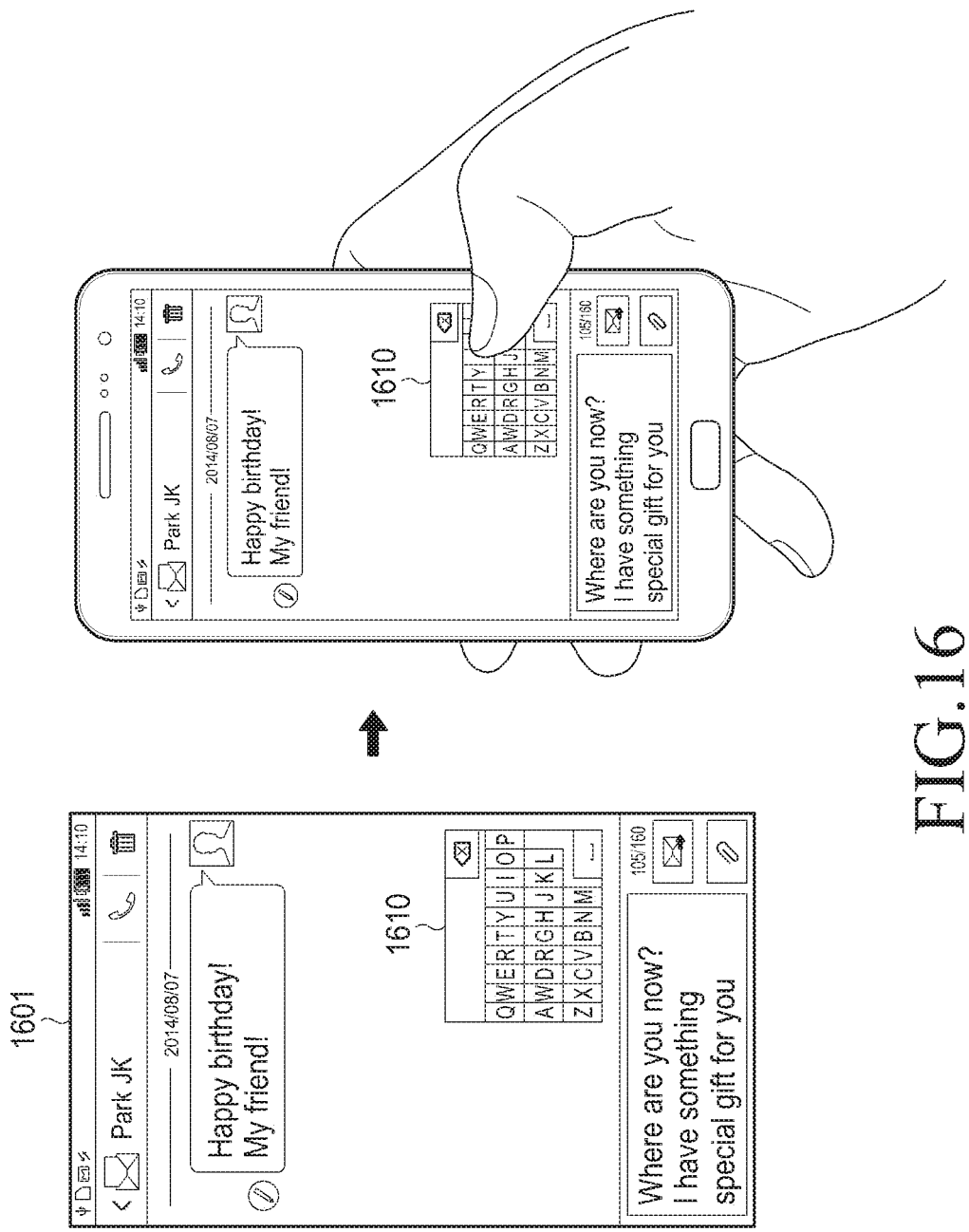
FIG. 16 illustrates an example of a screen configuration and an electronic device to which a letter input method according to an embodiment of the present disclosure.

FIG. 16 illustrates an example of a screen configuration and an electronic device to which a letter input method according to various embodiments of the present disclosure.

Referring to FIG. 16, a text message creation screen 1601, to which an automatic word recommendation function can be applied, may include a keypad 1610, which is much smaller in size than a touch keypad used in the typical electronic device (e.g., a smart phone).

According to various embodiments of the present disclosure, the user may input a letter even with one hand using the keypad 1610.

According to various embodiments of the present disclosure, at least one word similar to the input word may be automatically recommended depending on at least one input behavior related to the input letter.

According to the results of an experiment to which various embodiments of the present disclosure are applied, in a scheme in which the user inputs letters on the keypad 1610 with one hand, the user may input or type letters at a speed of 28.2 WPM, which reaches about 78% of the typical speed of 36.6 WPM at which the user inputs letters using both hands. For example, the typing speed in each of the above cases for at least one user is represented in units of words per minute (WPM).

According to various embodiments of the present disclosure, the one-hand letter input scheme based on the keypad 1610 may reach the typing speed of the typical two-hand letter input scheme. For example, the user may input letters even with one hand at a speed that sufficiently reaches the speed at which the user inputs letters using both hands.

Figure 17A:
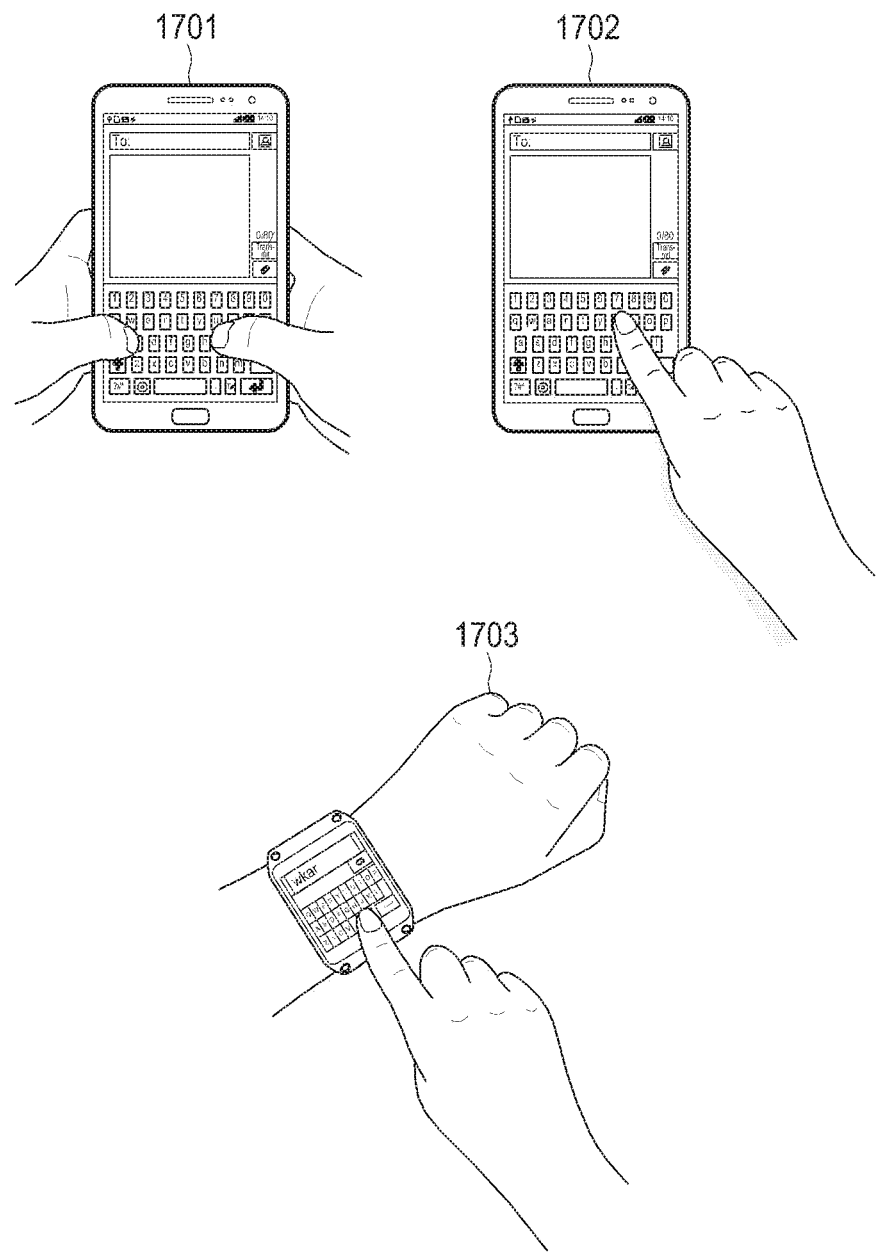
FIG. 17A illustrates an example of a letter input method according to an embodiment of the present disclosure.

FIG. 17A illustrates an example of a letter input method according to various embodiments of the present disclosure.

Referring to FIG. 17A, the assumptions will be made on (i) a case 1701 in which the user inputs letters on a smart phone using both hands, (ii) a case 1702 in which the user inputs letters on a smart phone using one hand, and (iii) a case 1703 in which the user inputs letters on an electronic device (e.g., a smart watch) to which various embodiments of the present disclosure can be applied. The results of typing speed (or letter input speed) for each case are described below with reference to FIGS. 17B and 17C.

Figure 17B:
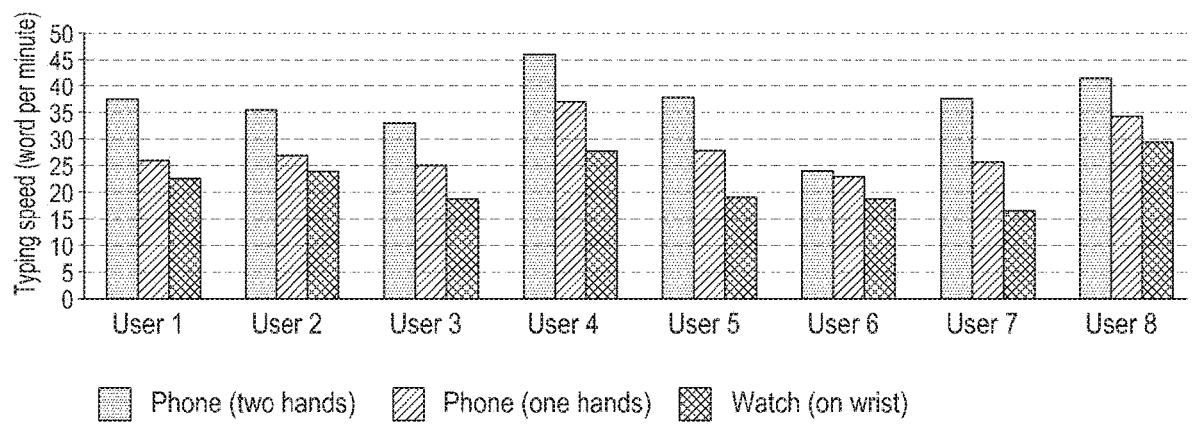
FIGS. 17B and 17C are graphs illustrating the results of a letter input method according to various embodiments of the present disclosure.
Figure 17C:
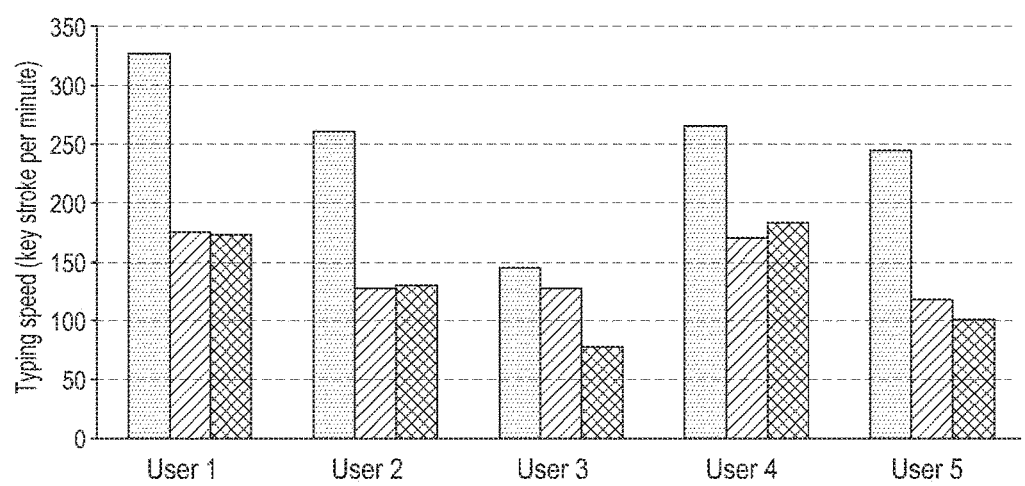

FIGS. 17B and 17C are graphs illustrating the results of a letter input method according to various embodiments of the present disclosure.

Referring to FIG. 17B, the typing speed in each of the above cases for at least one user (e.g., User 1~User 8) is represented in units of WPM.

As a result, the typing speed of the case 1701 was measured as 36.6 WPM on average, the typing speed of the case 1702 was measured as 28.2 WPM on average, and the typing speed of the case 1703 to which various embodiments of the present disclosure can be applied was measured as 22.2 WPM on average.

In short, the typing speed of the case 1703 to which various embodiments of the present disclosure can be applied was measured as about 68% of the typing speed in the case 1701, and about 78% of the typing speed in the case 1702.

Referring to FIG. 17C, the typing speed in each of the above cases for at least one user (e.g., User 1~User 5) is represented in units of key strokes per minute (KPM).

As a result, the typing speed of the case 1701 was measured as 247 KPM on average, the typing speed of the case 1702 was measured as 144 KPM on average, and the typing speed of the case 1703 to which various embodiments of the present disclosure can be applied was measured as 138 KPM on average.

In short, the typing speed of the case 1703 to which various embodiments of the present disclosure can be applied was measured as about 55% of the typing speed in the case 1701, and about 96% of the typing speed in the case 1702.

According to various embodiments of the present disclosure, the user may input letters at the speed sufficiently reaching the typing speed on the smart phone, even on the smart watch that includes a smaller screen or smaller keypad than the smart phone.

Figure 18A:
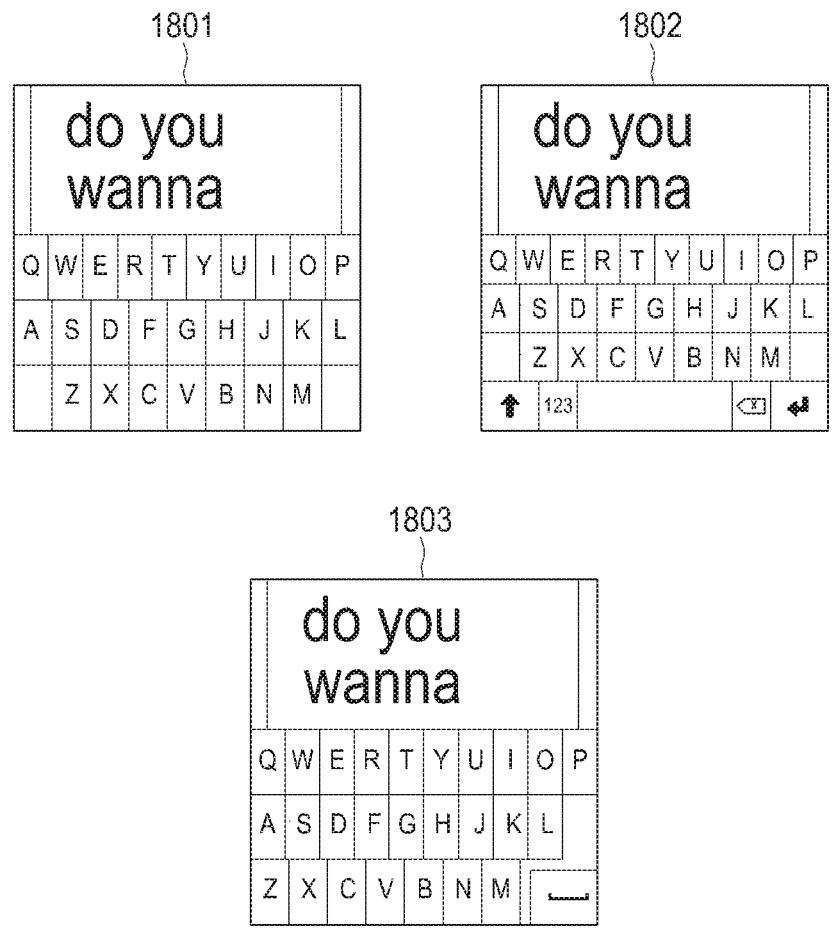
FIG. 18A illustrates an example of a letter input method according to an embodiment of the present disclosure.

FIG. 18A illustrates an example of a letter input method according to various embodiments of the present disclosure.

Referring to FIG. 18A, the assumptions will be made on (i) a case 1801 in which the user inputs letters on a keypad that does not include an area of special keys, (ii) a case 1802 in which the user inputs letters on a keypad on which special keys are arranged under letter keys, and (iii) a case 1803 in which the user inputs letters on a keypad on which a button for enabling an automatic word recommendation function is arranged adjacent to an area of letter keys, and other special keys are arranged thereover.

For example, the results of typing speed for each of the above cases will be described below with reference to FIGS. 18B and 18C.

Figure 18B:
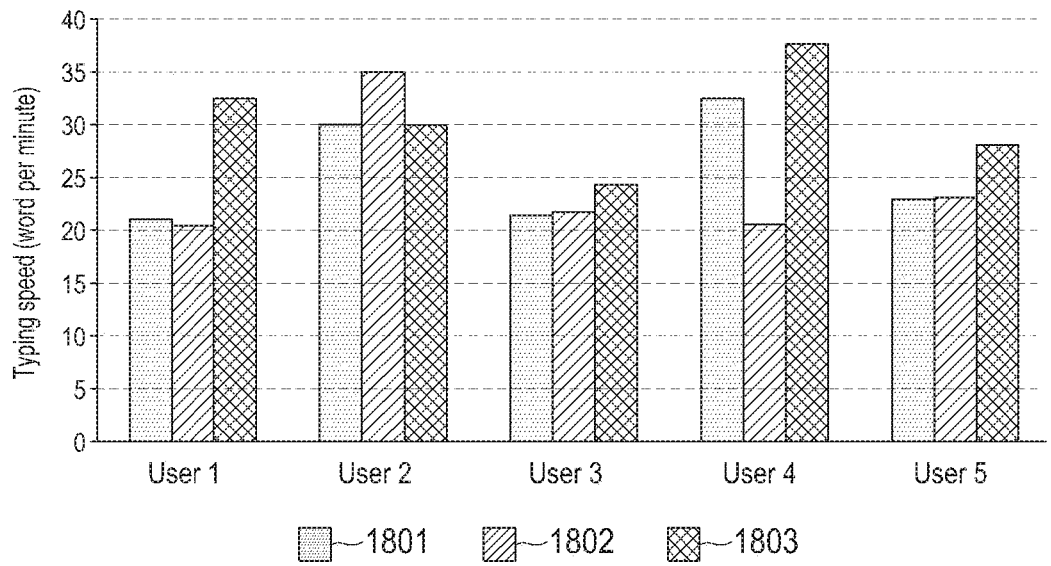
FIGS. 18B and 18C are graphs illustrating the results of a letter input method according to various embodiments of the present disclosure.
Figure 18C:
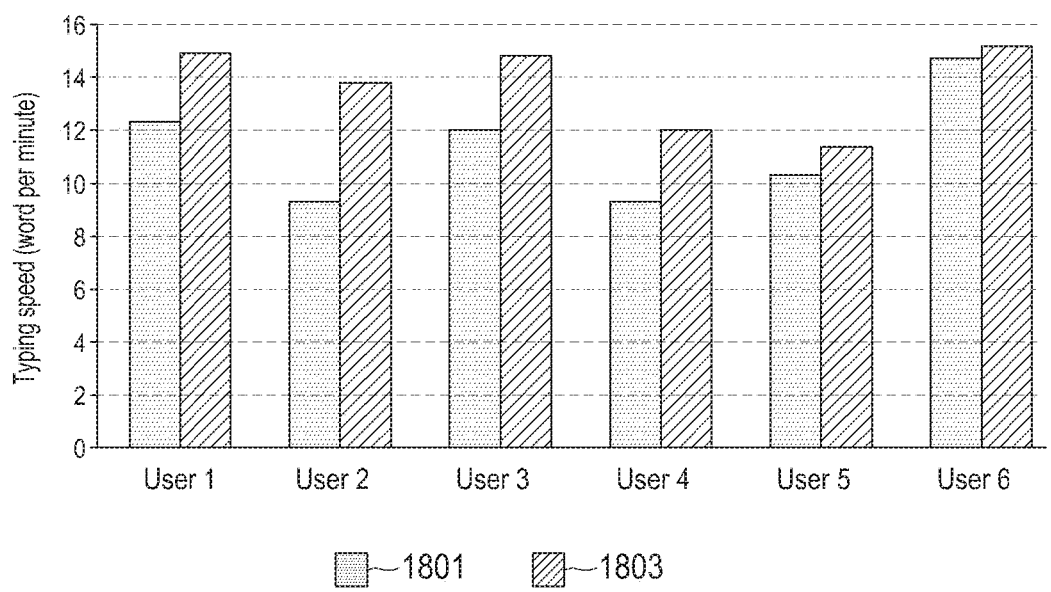

FIGS. 18B and 18C are graphs illustrating the results of a letter input method according to various embodiments of the present disclosure.

Referring to FIG. 18B, when at least one user (e.g., User 1~User 5) inputs typical English sentences, the typing speed in each of the above cases is represented in units of KPM.

As a result, the typing speed of the case 1803 was measured to be higher on average than the typing speed in other cases.

Referring to FIG. 18C, when at least one user (e.g., User 1~User 6) inputs confusing words or neologisms, the typing speed in the case 1801 and the case 1803 is represented in units of KPM.

As a result, the typing speed in the case 1803 was measured to be higher on average than the typing speed in the case 1801.

According to various embodiments of the present disclosure, when the inputs letters on a keypad on which a button for enabling an automatic word recommendation function is arranged adjacent to an area of letter keys, and other special keys are arranged thereover, like in the case 1803, the user may input letters at higher speed, compared with when the user inputs letters on a keypad of other layouts.

Figure 19:
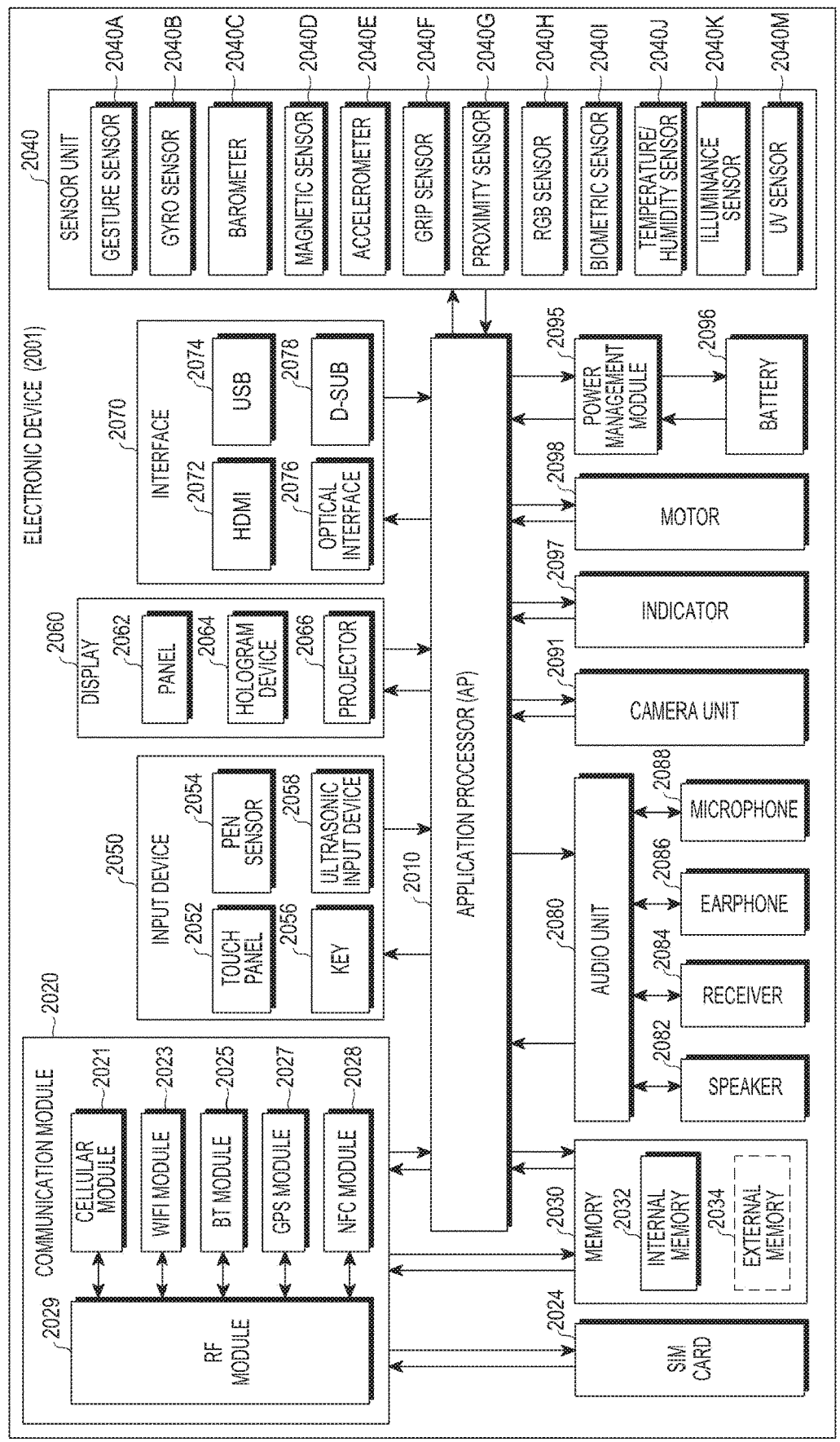
FIG. 19 is a block diagram illustrating an example of a structure of an electronic device according to an embodiment of the present disclosure.

FIG. 19 is a block diagram illustrating an example of a structure of an electronic device according to various embodiments of the present disclosure.

Referring to FIG. 19, an electronic device 2001 may include one or more processors (e.g., an application processor (AP)) 2010, a communication module 2020, a subscriber identification module (SIM) card 2024, a memory 2030, a sensor module 2040, an input device 2050, a display 2060, an interface 2070, an audio module 2080, a camera module 2091, a power management module 2095, a battery 2096, an indicator 2097, and a motor 2098.

The AP 2010 may control a plurality of hardware or software components connected to the AP 2010 by running the operating system or application program, and may process and compute various data including multimedia data. The AP 2010 may be implemented as, for example, system on chip (SoC). In one embodiment, the AP 2010 may further include a graphic processing unit (GPU) (not shown).

The communication module 2020 may perform data transmission and reception in communication between the electronic device 2001 and other electronic devices connected to the electronic device 2001 over the network. In one embodiment, the communication module 2020 may include a cellular module 2021, a WiFi module 2023, a Bluetooth (BT) module 2025, a GPS module 2027, a near field communication (NFC) module 2028, and a radio frequency (RF) module 2029.

The cellular module 2021 may provide voice call, video call, messaging service, or Internet service over a communication network (e.g., long term evolution (LTE), long term evolution advanced (LTE-A), code division multiple access (CDMA), wideband CDMA (WCDMA), universal mobile telecommunication system (UMTS), wireless broadband (WiBro), or global system for mobile communication (GSM)). The cellular module 2021 may identify and authenticate an electronic device in a communication network by using, for example, a SIM (e.g., the SIM card 2024).

According to an embodiment of the present disclosure, the cellular module 2021 may perform some of the functions that can be provided by the AP 2010. For example, the cellular module 2021 may perform at least some of the multimedia control function.

According to an embodiment of the present disclosure, the cellular module 2021 may include a communication processor (CP). The cellular module 2021 may be implemented as, for example, SoC. Although the components such as the cellular module 2021 (e.g., the CP), the memory 2030 or the power management module 2095 are shown in FIG. 19 as separate components independent of the AP 2010, the AP 2010 may be implemented to include at least some (e.g., the cellular module 2021) of the above-described components according to an embodiment.

According to an embodiment of the present disclosure, the AP 2010 or the cellular module 2021 (e.g., the CP) may load, on a volatile memory, a command or data received from at least one of a non-volatile memory or other components connected thereto, and process the loaded command or data. The AP 2010 or the cellular module 2021 may store, in a non-volatile memory, the data that is received from or generated by at least one of other components.

Each of the WiFi module 2023, the BT module 2025, the GPS module 2027 or the NFC module 2028 may include, for example, a processor for processing the data that is transmitted or received through the module itself. Although the cellular module 2021, the WiFi module 2023, the BT module 2025, the GPS module 2027 and the NFC module 2028 are shown as separate blocks in FIG. 19, at least some (e.g., two or more) of the cellular module 2021, the WiFi module 2023, the BT module 2025, the GPS module 2027 and the NFC module 2028 may be incorporated into one integrated chip (IC) or IC package According to an embodiment of the present disclosure. For example, at least some (e.g., a CP corresponding to the cellular module 2021 and a WiFi processor corresponding to the WiFi module 2023) of the processors corresponding to the cellular module 2021, the WiFi module 2023, the BT module 2025, the GPS module 2027 and the NFC module 2028 may be implemented as one SoC.

The RF module 2029 may transmit and receive data, for example, RF signals. The RF module 2029, though not shown, may include, for example, a transceiver, a power amplifier module (PAM), a frequency filter, or a low noise amplifier (LNA). The RF module 2029 may further include parts (e.g., conductors or conducting wires) for transmitting and receiving electromagnetic waves in the free space in wireless communication. Although the cellular module 2021, the WiFi module 2023, the BT module 2025, the GPS module 2027 and the NFC module 2028 are shown in FIG. 19 to share one RF module 2029 with each other, at least one of the cellular module 2021, the WiFi module 2023, the BT module 2025, the GPS module 2027 or the NFC module 2028 may transmit or receive RF signals through a separate RF module according to one embodiment.

The SIM card 2024 may be a card including a SIM, and may be inserted into a slot formed in a specific position of the electronic device. The SIM card 2024 may include unique identification information (e.g., integrated circuit card identifier (ICCID)) or subscriber information (e.g., international mobile subscriber identity (IMSI)).

The memory 2030 may include an internal memory 2032 or an external memory 2034. The internal memory 2032 may include at least one of, for example, a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, etc.).

In one embodiment, the external memory 2034 may be a solid state drive (SSD). The external memory 2034 may further include a flash drive, for example, compact flash (CF), secure digital (SD), micro-SD, mini-SD, extreme digital (xD) or memory stick. The external memory 2034 may be functionally connected to the electronic device 2001 through various interfaces. In one embodiment, the electronic device 2001 may further include a storage device (or a storage medium) such as a hard drive.

The sensor module 2040 may measure a physical quantity, or detect an operating state of the electronic device 2001, and convert the measured or detected information into an electrical signal. The sensor module 2040 may include at least one of, for example, a gesture sensor 2040A, a gyro sensor 2040B, a barometer 2040C, a magnetic sensor 2040D, an accelerometer 2040E, a grip sensor 2040F, a proximity sensor 2040G, a color sensor (e.g., red-green-blue (RGB) sensor) 2040H, a biometric sensor 2040I, a temperature/humidity sensor 2040J, an illuminance sensor 2040K, and a ultraviolet (UV) sensor 2040M. Additionally or alternatively, the sensor module 2040 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 2040 may further include a control circuit for controlling one or more sensors belonging thereto.

The input device 2050 may include a touch panel 2052, a (digital) pen sensor 2054, a key 2056 or an ultrasonic input device 2058. The touch panel 2052 may recognize a touch input in at least one of, for example, a capacitive scheme, a resistive scheme, an IR scheme, or an ultrasonic scheme. The touch panel 2052 may further include a control circuit. The touch panel 2052, if based on the capacitive scheme, may recognize a physical contact or proximity. The touch panel 2052 may further include a tactile layer. In this case, the touch panel 2052 may provide a tactile feedback to the user.

The (digital) pen sensor 2054 may be implemented by using, for example, the same or similar method as/to receiving a user's touch input, or a separate recognition sheet. The key 2056 may include, for example, a physical button, an optical key, or a keypad. The ultrasonic input device 2058 is a device that can determine data, through an input tool generating an ultrasonic signal, by detecting sound waves with a microphone (e.g., a microphone 2088) in the electronic device 2001. The ultrasonic input device 2058 may enable wireless recognition. In one embodiment, the electronic device 2001 may receive a user input from an external device (e.g., a computer or a server) connected thereto, using the communication module 2020.

The display 2060 may include a panel 2062, a hologram device 2064 or a projector 2066. The panel 2062 may be, for example, a liquid-crystal display (LCD) panel or an active-matrix organic light-emitting diode (AM-OLED). The panel 2062 may be implemented to be, for example, flexible, transparent or wearable. The panel 2062, together with the touch panel 2052, may be implemented as one module. The hologram device 2064 may display stereoscopic images in the air by using the interference of light. The projector 2066 may display images by projecting the light on the screen. The screen, for example, may be disposed in the inside or outside the electronic device 2001.

According to an embodiment of the present disclosure, the display 2060 may further include a control circuit for controlling the panel 2062, the hologram device 2064 or the projector 2066.

The interface 2070 may include, for example, a high-definition multimedia interface (HDMI) 2072, a universal serial bus (USB) 2074, an optical interface 2076, or a D-subminiature (D-sub) 2078. Additionally or alternatively, the interface 2070 may include, for example, a mobile high-definition link (MHL) interface, an SD card/multimedia card (MMC) interface, or an infrared data association (IrDA) interface.

The audio module 2080 may convert the sound and the electrical signal bi-directionally. The audio module 2080 may process the sound information that is input or output through, for example, a speaker 2082, a receiver 2084, an earphone 2086 or the microphone 2088.

The camera module 2091, which is a device capable of shooting still images or videos, may include, for example, one or more image sensors (e.g., a front sensor or a rear sensor), a lens (not shown), an image signal processor (ISP) (not shown), or a flash (not shown) (e.g., LED or xenon lamp) according to one embodiment.

The power management module 2095 may manage the power of the electronic device 2001. Although not shown, the power management module 2095 may include, for example, a power management integrated circuit (PMIC), a charger IC, or a battery or fuel gauge.

The PMIC may be mounted in, for example, an IC or an SoC chip. A charging scheme may be divided into a wired charging scheme and a wireless charging scheme. The charger IC may charge a battery, and prevent the inflow of the overvoltage or overcurrent from the charger.

According to an embodiment of the present disclosure, the charger IC may include a charger IC for at least one of the wired charging scheme and the wireless charging scheme. The wireless charging scheme may include, for example, a magnetic resonance scheme, a magnetic induction scheme or an electromagnetic scheme, and an additional circuit (e.g., a loop coil, a resonance circuit or a rectifier) for wireless charging may be added.

The battery gauge may measure, for example, the remaining capacity, the charging voltage, the charging current, or the temperature of the battery 2096. The battery 2096 may store or generate the electricity, and supply the power to the electronic device 2001 using the stored or generated electricity. The battery 2096 may include, for example, a rechargeable battery or a solar battery.

The indicator 2097 may indicate a specific state (e.g., a boot state, a message state, or a charging state) of the electronic device 2001 or a part thereof (e.g., the AP 2010). The motor 2098 may convert an electrical signal into mechanical vibrations. Although not shown, the electronic device 2001 may include a processing device (e.g., a GPU) for supporting Mobile TV. The processing device for supporting Mobile TV may process the media data that is based on the standards such as, for example, digital multimedia broadcasting (DMB), digital video broadcasting (DVB) or Media Flow.

Each of the above-described components of the electronic device according to various embodiments of the present disclosure may include one or more parts, and the names of the components may vary depending on the type of the electronic device. The electronic device according to various embodiments of the present disclosure may include at least one of the above components, some of which may be omitted, or may further include other additional components. Some of the components of the electronic device according to various embodiments of the present disclosure may be configured as one entity by being combined, so the entity may perform the previous functions of the components in the same way.

As used herein, the term 'module' may refer to a unit that includes one of, or a combination of, for example, hardware, software or firmware. The term 'module' may be interchangeably used with the terms such as, for example, unit, logic, logical block, component or circuit. The module may be the minimum unit of a component that is configured as a single body, or a part thereof. The module may be the minimum unit that performs one or more functions, or a part thereof. The module may be implemented mechanically or electronically. For example, the module may include at least one of an application-specific integrated circuit (ASIC) chip, a field-programmable gate arrays (FPGAs) chip or a programmable-logic device, which have been known, or will be developed in the future, and which may perform any operations.

At least a portion of the device (modules or their functions) or method (operations) according to various embodiments of the present disclosure may be implemented by, for example, a command that is stored in a computer-readable storage media in the form of a programming module. If the command is executed by at least one processor (e.g., a control module), the at least one processor may perform a function corresponding to the command. The computer-readable storage media may be further included, for example, in the electronic device as a memory. At least a portion of the programming module may be implemented (e.g., executed) by, for example, the processor. At least a portion of the programming module may include, for example, a module, a program, a routine, a set of instructions, or a process for performing one or more functions.

The computer-readable storage media may include magnetic media (e.g., a hard disk, a floppy disk and magnetic media), optical media (e.g., compact disc ROM (CD-ROM) and DVD), magneto-optical media (e.g., floptical disk)), and a hardware device (e.g., ROM, RAM or flash memory), which is specifically configured to store and execute a program command (e.g., a programming module).

In addition, the program command may include not only the machine code made by the compiler, but also the high-level language code that can be executed by the computer using the interpreter and the like. The hardware device may be configured to operate as one or more software modules to perform the operations according to various embodiments of the present disclosure, and vice versa.

The module or programming module according to various embodiments of the present disclosure may include at least one of the above-described components, some of which can be omitted, or may further include other additional components. The operations performed by the module, the programming module or other components according to various embodiments of the present disclosure may be performed in a sequential, parallel, iterative or heuristic manner. In addition, some operations may be performed in a different order, or omitted, or other operations may be added.

According to various embodiments of the present disclosure, in a storage medium that stores instructions, when the instructions are executed by at least one processor, the instructions may be set to allow the at least one processor to perform at least one operation. The at least one operation may include, if at least one letter is input, determining at least one input behavior related to the input; and if a predetermined delimiter is input, determining whether to disable a function of automatically recommending at least one word similar to an input word, based on the determined input behavior.

As is apparent from the foregoing description, various embodiments of the present disclosure may provide an electronic device and a method for processing a letter input in an electronic device, in which the user may quickly type letters on a small screen with fewer errors.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display; and
at least one processor configured to:
in response to at least one letter being input, identify at least one input behavior for the input of the at least one letter,
in response to the at least one input behavior being identified as a first touch input, enable a function of automatically recommending at least one word similar to an input word including the at least one letter, and control the display to display a first word recommended by the function of automatically recommending, wherein the at least one letter in the input word is changed to at least one letter in the first word, and in response to the at least one input behavior being identified as a second touch input, disable the function of automatically recommending at least one word similar to the input word, and control the display to display the input word without changing the input word.

2. The electronic device of claim 1, wherein each of the first touch input and the second touch input is related to at least one of a time for which a touch is held for the input, a touch pressure of the input, a contact area of the input or a behavior of a gesture.

3. The electronic device of claim 1, wherein the at least one processor is further configured to:
based on the first touch input being held within a first predetermined time range, enable the function of automatically recommending, and
based on the second touch input being held longer than the first predetermined time range, disable the function of automatically recommending.

4. The electronic device of claim 1,
wherein the at least one processor is further configured to:
in response to the at least one input behavior being identified as a third touch input, enable a function of automatically recommending at least one word similar to the input word, and display a second word recommended by the function of automatically recommending without displaying the first word,
wherein the at least one letter is maintained in the second word,
wherein the input word and the second are different from each other, and
wherein the third touch input is related to at least one of a time for which a touch is held for the input, a touch pressure of the input, a contact area of the input or a behavior of a gesture.

5. The electronic device of claim 4,
wherein the at least one processor is further configured to enable the function of automatically recommending based on the third touch input being held within a predetermined time range, and
wherein the predetermined time range of the third touch input longer than a time range the first touch input is held and is shorter than a time range in which the second touch is held.

6. The electronic device of claim 1, wherein the at least one processor is further configured to:
obtain a predetermined delimiter received next to the input word, and
in response to obtaining the predetermined delimiter, determine whether to disable the function of automatically recommending.

7. The electronic device of claim 1, wherein the at least one processor is further configured to:
based on the second touch input being made with a pressure greater than or equal to a predetermined value, disable the function of automatically recommending, and
based on the second touch input being made with an area greater than or equal to a predetermined value, disable the function of automatically recommending.

8. The electronic device of claim 1, wherein the at least one processor is further configured to:
expand, based on a touch in a keypad area being held for a predetermined time or more, the touched keypad area or a perimeter of the touched keypad area by an amount greater than or equal to a predetermined value or more.

9. A method for processing a letter input in an electronic device, the method comprising:
in response to at least one letter being input, identifying at least one input behavior for the input of the at least one letter;
in response to the at least one input behavior being identified as a first touch input, enabling a function of automatically recommending at least one word similar to an input word including the at least one letter, and displaying a first word recommended by the function of automatically recommending, wherein the at least one letter in the input word is changed to at least one letter in the first word; and
in response to the at least one input behavior being identified as a second touch input, disabling the function of automatically recommending at least one word similar to the input word, and displaying the input word without changing the input word.

10. The method of claim 9, wherein the enabling of the function of automatically recommending comprises based on the first touch input being held within a first predetermined time range, enabling the function of automatically recommending, and
wherein the disabling of the function of automatically recommending comprises based on the second touch input being held longer than the first predetermined time range, disabling the function of automatically recommending.

11. The method of claim 9, further comprising:
in response to the at least one input behavior being identified as a third touch input, enabling a function of automatically recommending at least one word similar to the input word, and displaying a second word recommended by the function of automatically recommending without displaying the first word,
wherein the at least one letter is maintained in the second word,
wherein the input word and the second are different from each other, and
wherein the third touch input is related to at least one of a time for which a touch is held for the input, a touch pressure of the input, a contact area of the input or a behavior of a gesture.

12. The method of claim 11, wherein the enabling the function of automatically recommending comprises based on the third touch input being held within a predetermined time range, enabling the function of automatically recommending, and
wherein the predetermined time range of the third touch input longer than a time range the first touch input is held and is shorter than a time range in which the second touch is held.

13. The method of claim 9, wherein the disabling the function of automatically recommending comprises based on the second touch input being made with a pressure greater than or equal to a predetermined value, disabling the function of automatically recommending.

14. The method of claim 9, further comprising:
wherein the disabling the function of automatically recommending comprises based on the second touch input being made with an area greater than or equal to a predetermined value, disabling the function of automatically recommending.

15. A non-transitory computer readable storage medium recording a program for executing a method for processing a letter input by at least one processor in an electronic device, the method comprising:
  in response to at least one letter being input, identifying at least one input behavior for the input of the at least one letter;
  in response to the at least one input behavior being identified as a first touch input, enabling a function of automatically recommending at least one word similar to an input word including the at least one letter, and displaying a first word recommended by the function of automatically recommending, wherein the at least one letter in the input word is changed to at least one letter in the first word; and
  in response to the at least one input behavior being identified as a second touch input, disabling the function of automatically recommending at least one word similar to the input word, and displaying the input word without changing the input word.

* * * * *